US006367693B1

(12) United States Patent
Novogrod

(10) Patent No.: US 6,367,693 B1
(45) Date of Patent: Apr. 9, 2002

(54) SYSTEM AND METHOD FOR REQUESTING AND DISPENSING NEGOTIABLE INSTRUMENTS

(76) Inventor: John C. Novogrod, 133 E. 64th St., Apartment 6A, New York, NY (US) 10021

( * ) Notice: Subject to any disclaimer, the term of this patent is extended or adjusted under 35 U.S.C. 154(b) by 0 days.

(21) Appl. No.: 09/498,960

(22) Filed: Feb. 4, 2000

Related U.S. Application Data

(62) Division of application No. 08/942,957, filed on Oct. 2, 1997, now Pat. No. 6,119,931.

(51) Int. Cl.[7] ............................................ G06F 17/60
(52) U.S. Cl. ............................ 235/379; 235/381; 902/8
(58) Field of Search ................................ 235/379, 381, 235/383, 385, 472.01, 472.02; 902/8, 14, 18, 24; 705/35, 39–41

(56) References Cited

U.S. PATENT DOCUMENTS 3,183,829 A * 5/1965 Kreidich
4,053,735 A * 10/1977 Foudos ................... 235/379 X
4,234,932 A * 11/1980 Gorgens ................. 235/379 X (List continued on next page.)

FOREIGN PATENT DOCUMENTS

WO WO 93/09506 5/1993 ........... G06F/17/60
WO WO 96/38801 12/1996 ........... G06F/17/60

OTHER PUBLICATIONS

Youssef M. Ibrahim, "Made in Finland, Sold Just About All Over," *The New York Times*, Aug. 13, 1997, at D1–D1.
Brian Tracey, "The Color of Money," *The Wall Street Journal*—Technology, Nov. 16, 1998, at R28.
Paul Beckett and Larry M. Greenberg, "Smart Card Still Needs More Answers, Sponsors Concede, as Big Test Nears End," *The New York Times*, Nov. 4, 1998.
Saul Hansell, "Got a Dime? Citibank and Chase End Test of Electronic Cash," Nov. 4, 1998.

*Primary Examiner*—Karl D. Frech
(74) *Attorney, Agent, or Firm*—Fish & Neave; Alexander Shvarts

(57) ABSTRACT

A system and method for requesting and dispensing negotiable instruments such as bank checks, money orders, and traveler's checks. An instrument may be requested in this system and method by a bank customer from a telephone, a computer, a fixed-location dispenser, or a portable, hand-held dispenser that is in communication with a bank computer. This request may be made orally, using touch tones, or using data transmission over a communication network that may include telephone lines, two-way radio links, microwave links, satellite links, cellular telephone links, computer networks, and the Internet. After a request is processed and approved, the requested instrument may then be dispensed at any time in this system and method to the bank customer or another party from any receive-only dispenser, fixed-location dispenser, or portable, hand-held dispenser that is also in communication with the bank computer.

16 Claims, 18 Drawing Sheets

U.S. PATENT DOCUMENTS 4,355,369 A * 10/1982 Garvin .................. 235/379 X
4,385,285 A 5/1983 Horst et al. .................... 382/3
4,390,968 A * 6/1983 Hennessy et al. ....... 235/379 X
4,511,970 A 4/1985 Okano et al. ............... 364/401
4,625,275 A 11/1986 Smith ......................... 364/401
4,630,201 A 12/1986 White ........................ 364/408
4,699,532 A 10/1987 Smith ......................... 400/104
4,812,986 A 3/1989 Smith ......................... 364/479
4,870,596 A 9/1989 Smith ......................... 364/479
4,894,784 A 1/1990 Smith ......................... 364/479
4,918,723 A 4/1990 Iggulden et al. ............ 379/100
4,926,325 A 5/1990 Benton et al. .............. 364/408
5,014,212 A 5/1991 Smith ......................... 364/479
5,025,373 A 6/1991 Keyser, Jr. et al. ......... 364/408
5,050,207 A 9/1991 Hitchcock .................... 379/96
5,119,293 A 6/1992 Hammond .................. 364/401
5,221,838 A * 6/1993 Gutman et al. ............. 235/379
5,299,295 A 3/1994 Kim et al. .................. 395/111
5,341,290 A 8/1994 Lu ............................. 364/408
5,349,534 A 9/1994 Rousseff et al. ............ 364/479
5,477,037 A 12/1995 Berger ........................ 235/379
5,570,465 A 10/1996 Tsakanikas ................. 395/114
5,774,877 A 6/1998 Patterson, Jr. et al. ........ 705/35
5,787,405 A 7/1998 Gregory ...................... 705/45

* cited by examiner

SYSTEM AND METHOD FOR REQUESTING AND DISPENSING NEGOTIABLE INSTRUMENTS

CROSS REFERENCE TO RELATED APPLICATION

This is a divisional of commonly-assigned U.S. patent application Ser. No. 08/942,957, filed Oct. 2, 1997, now U.S. Pat. No. 6,119,931.

BACKGROUND OF THE INVENTION

The present invention relates generally to systems and methods for requesting and dispensing negotiable instruments such as bank checks, traveler's checks, and money orders. More particularly, the present invention relates to systems and methods that enable bank customers to request and receive negotiable instruments from machines that print the requested instruments, and that are located remotely from one or more authorizing banks or automated teller machines ("ATMs").

Some known systems and methods for requesting and dispensing negotiable instruments provide public dispensing devices, such as ATMs, that are wall mounted units which may be found in places such as banks, airports, train and bus stations, supermarkets, etc. Such dispensing devices are inconvenient in that a bank customer must locate such a device before a desired negotiable instrument can be obtained. In many instances it may not be possible to locate such a device, particularly when a bank customer is in a remote location or when it is very late at night.

Another known system and method for requesting and dispensing negotiable instruments provides a portable dispensing device that a bank customer may carry. This device is inconvenient in that the bank customer must first download a sufficient amount of money to the device to cover any instruments which the customer wishes to dispense. To do so, the bank customer may have to go to, or ship the device to, a bank or some other facility where the download can take place. Such a requirement may render the device useless to a bank customer in the event that the customer requires an instrument that exceeds the balance remaining in the portable device. This may be particularly frustrating to the customer in situations in which the customer has the required funds in an account with a bank affiliated with the dispensing device, but such funds have not yet been downloaded to the dispensing device.

In some known systems and methods for requesting and dispensing negotiable instruments, requested negotiable instruments may only be dispensed from an instrument dispenser that is used to request the negotiable instrument, such as an ATM that dispenses traveler's checks. This requirement is inconvenient in that in many instances a party may desire to request, at one location, an instrument that is to be dispensed to another party at a second location. For example, a parent at home may request that a money order be dispensed to that parent's child from an instrument dispenser at a summer camp, boarding school, or college.

In view of the foregoing, it would be desirable to provide a system and method for requesting and dispensing negotiable instruments through which a bank customer can request and receive a negotiable instrument without having to locate and use a public negotiable instrument dispensing device.

It would also be desirable to provide a system and method for requesting and dispensing negotiable instruments through which a bank customer can request and receive a negotiable instrument using a portable, hand-held dispenser that obtains authorization to dispense the negotiable instrument by communicating with an authorizing bank over a wireless communication link.

It would be further desirable to provide a system and method for requesting and dispensing negotiable instruments through which a bank customer can request from one device that a negotiable instrument be printed and dispensed from another device.

SUMMARY OF THE INVENTION

It is therefore an object of this invention to provide a system and method for requesting and dispensing negotiable instruments through which a bank customer can request and receive a negotiable instrument without having to locate and use a public negotiable instrument dispensing device.

It is another object of this invention to provide a system and method for requesting and dispensing negotiable instruments through which a bank customer can request and receive a negotiable instrument using a portable, hand-held dispenser that obtains authorization to dispense the negotiable instrument by communicating with an authorizing bank over a wireless communication link.

It is a further object of this invention to provide a system and method for requesting and dispensing negotiable instruments through which a bank customer can request from one device that a negotiable instrument be printed and dispensed from another device.

These and other objects of the present invention are achieved by providing a system and method for requesting and dispensing negotiable instruments such as bank checks, money orders, and traveler's checks. An instrument may be requested through this system and method by a bank customer from a telephone, a computer, a fixed-location dispenser, or a portable, hand-held dispenser that is in communication with a bank computer. This request may be made orally, using touch tones, or using data transmission over a communication network that may include telephone lines, two-way radio links, microwave links, satellite links, cellular telephone links, computer networks, and/or the Internet. After a request is processed and approved, the requested instrument may then be dispensed at any time to the bank customer or another party from any receive-only dispenser, fixed-location dispenser, or portable, hand-held dispenser that is also in communication with the bank computer.

BRIEF DESCRIPTION OF THE DRAWINGS

The above and other objects and advantages of the present invention will be apparent upon consideration of the following detailed description, taken in conjunction with the accompanying drawings, in which like reference numerals refer to like parts throughout, and in which.

DETAILED DESCRIPTION OF THE INVENTION

Figure 1:
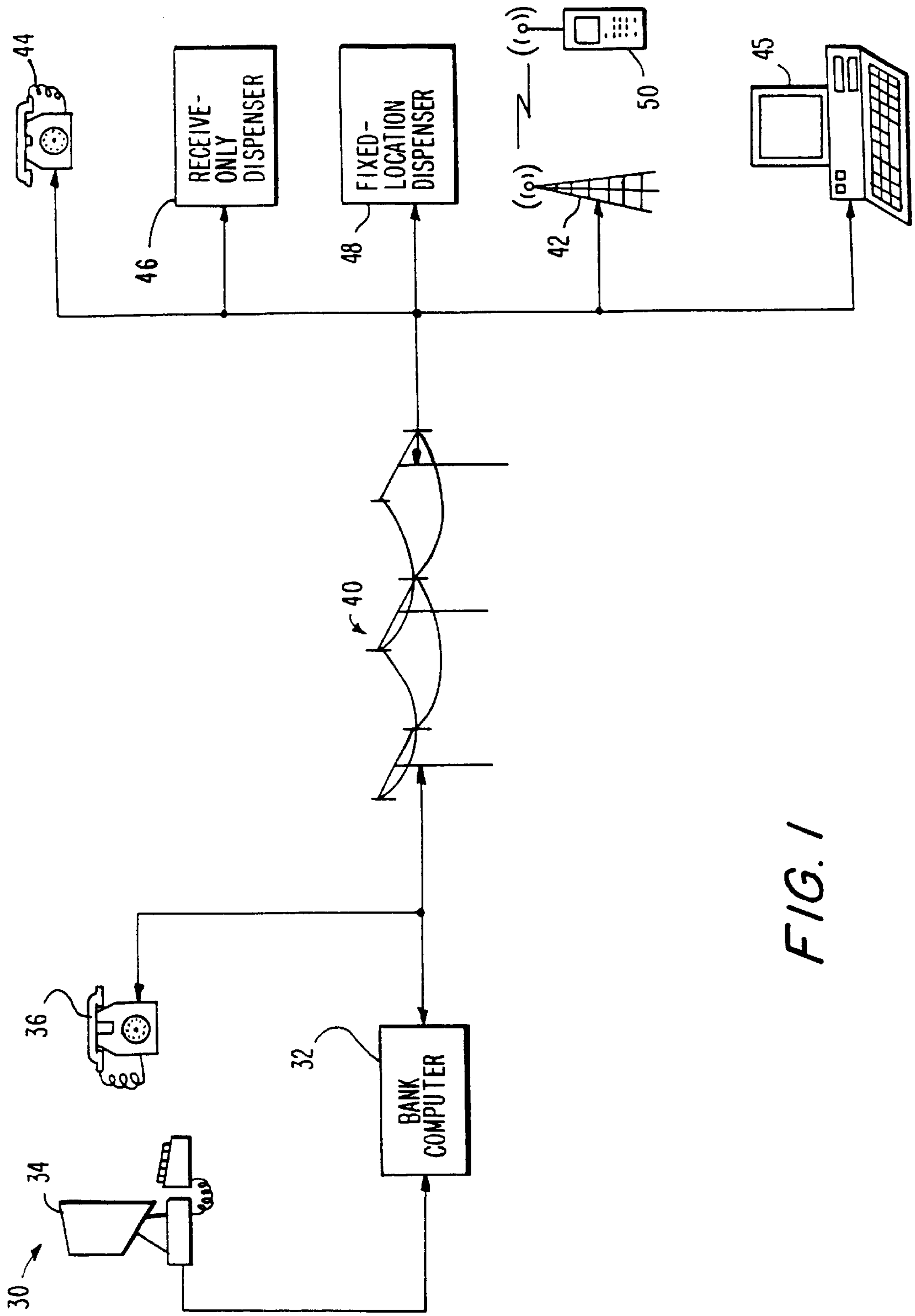
FIG. 1 is a block diagram of an illustrative system for requesting and dispensing negotiable instruments in accordance with the present invention.

As stated above, the present invention provides a system and method that allows bank customers to request and receive negotiable instruments from instrument dispensers that are located remotely from an issuing bank without the need to locate and use a publicly-available ATM. Instrument dispensers may include receive-only dispensers, fixed-location dispensers, and portable, hand-held dispensers. Receive-only dispensers are designed to only dispense instruments that are requested using another device. These dispensers may be preferred in locations, such as boarding school or college dormitories, or the homes of elderly or ill relatives or friends, where there is a need to dispense instruments but little need to request instruments because instruments are likely to be requested from other locations.

Fixed-location dispensers are general purpose dispensers that provide the capabilities to both request and dispense instruments. These dispensers may be located in a banks customer's home, buildings (such as commercial offices, hotel rooms, airports, and train and bus stations), automobiles, planes, trains, buses, and/or any other suitable location. Preferred fixed-location dispensers further include a telephone operating mode that allows access to telephone banking systems.

Portable, hand-held dispensers, like fixed-location dispensers, provide the capabilities to request and dispense instruments, and in preferred embodiments include a telephone operating mode that allows the dispenser to be used as an ordinary telephone or used to access a telephone banking system. These portable, hand-held dispensers preferably are a size and weight that enable the dispensers to be easily held in a single hand, and preferably incorporate a battery power source and wireless telephone that enable the dispensers to be used without having to be physically connected to an external power source or communication link.

In order to receive a negotiable instrument, a bank customer must first generate a request for the desired instrument. This request may be generated using a telephone, a computer, a fixed-location dispenser, or a portable, hand-held dispenser. The request may be made using interactive modes or a non-interactive mode. In the interactive modes, menu options and prompts are communicated to a bank customer by a bank computer either acoustically (i.e., using voice based menus and prompts) or digitally (i.e., using data transmission). Acoustically communicated menu options and prompts may be received by a bank customer through a telephone, or through a fixed-location dispenser or portable, hand-held dispenser that is operating as a telephone. Digitally communicated menu options and prompts may be received by a bank customer through a customer computer, fixed-location dispenser, or portable, hand-held dispenser that displays the menu options and prompts electronically on a display screen. The bank customer responds to each of these prompts as they are presented and the responses are processed and organized by the bank computer to form the instrument request.

In the non-interactive mode, menu options and prompts are generated and presented electronically on a display screen to a bank customer by a customer computer, fixed-location dispenser, or portable, hand-held dispenser. These menu options and prompts are then responded to by the bank customer, and the responses are processed and organized by the customer computer, fixed-location dispenser, or portable, hand-held dispenser to form the instrument request. Once the instrument request has been formed, the instrument request is transmitted to the bank computer from the customer computer, fixed-location dispenser, or portable, hand-held dispenser.

When requesting an instrument, a bank customer may be required to specify, for example, the account number from which the instrument is to be drawn, a personal identification number (PIN) associated with that account, the type of instrument requested (e.g., a bank check, money order, or traveler's check), the value of the instrument, the national currency in which the instrument is to be issued (e.g., dollars, francs, marks, etc.), the name of a payee of the instrument, the address of the payee of the instrument, the date of the instrument, a memo for the instrument, a designation of the instrument dispenser from which the requested instrument is to be dispensed, when the instrument may first be dispensed, and/or any other suitable information. On the other hand, when requesting a traveler's check, for example, the bank customer may be permitted to leave the value of the instrument, the national currency in which the instrument is to be issued, the name of a payee of the instrument, the address of the payee of the instrument, the date of the instrument, and any memo for the instrument unspecified.

As noted above, in selecting a designated instrument dispenser, the bank customer is not limited to selecting a particular instrument dispenser from which the customer may be submitting the instrument request, but rather the customer may select any desired instrument dispenser that can communicate with the bank computer.

Once the request information has been generated, either in whole (in a non-interactive mode) or in part (in an interactive mode), the requested information is then transmitted to a bank computer over a communication network, such as a telephone system. The request is preferably transmitted as a single continuous burst of data in the non-interactive mode, and as a series of individual responses, either by voice, Dual Tone Multi-Frequency (DTMF) tones, or data, to prompts provided by a bank computer in the interactive modes, although any suitable method of transmitting data may be used. The communication network may include a wireless telephone, radio, or satellite network to facilitate requests from wireless telephones, radio transceivers, and portable, hand-held dispensers. The communication network may also include a computer network to facilitate requests from customer computers, fixed-location dispensers, and portable, hand-held dispensers that are connected to computer networks or the Internet. DTMF tone requests and data transmission requests are preferably transmitted directly from the communication network into the bank computer. Voice requests may be entered into the bank computer using a suitable voice recognition system or using a bank employee to type the voice requests into a bank computer terminal connected to the bank computer.

After a request has been received by the bank computer, the request is processed to determine if dispensing of the requested instrument is authorized. Whether authorization is granted may be based upon factors such as the value of the instrument requested, the available balance or credit in the customer's account, whether the bank customer has entered an authentic personal identification number (PIN), whether the bank can authorize dispensing of negotiable instruments in the designated currency, the number or value of previously made requests, and/or any other suitable criteria. After the bank computer has determined whether the request is authorized, the bank computer then transmits an authorization or denial notification to the customer. This notification is preferably given substantially instantaneously to the customer over the same device through which the request was submitted (e.g., a customer telephone, a customer computer, a fixed-location dispenser, or a portable, hand-held dispenser). For example, a notification in response to an oral request may be given through a prerecorded or synthesized audio message played to the customer, or through a bank employee reading the notification off a bank computer terminal to the customer, during the same telephone call through which the request was submitted.

If the request is authorized, dispensing information is then also transmitted from the bank computer to a designated receive-only dispenser, fixed-location dispenser, or portable, hand-held dispenser. The dispensing information may include a payee name, a payee address, the face amount of the instrument, a national currency type, a request date, an instrument date, a memo, a security mechanism such as an authorization code or a digitized copy of the customer's signature, an account number, an instrument type (e.g., a bank check, money order, or traveler's check), an instrument number, a PIN that must be entered by the recipient to receive the instrument, the date on which the instrument may first be dispensed, and/or any other suitable information. This information may be transmitted as part of the authorization notification (when the notification is transmitted as data) or as a separate data transmission.

When transmitting dispensing information to a designated instrument dispenser, a bank computer may have to first establish communications with the instrument dispenser before the information can be transmitted. For example, in those cases in which a customer requests that an instrument be dispensed from a designated instrument dispenser that is not the same as an instrument dispenser that is being used to submit the instrument request, or in instances where a customer submits an instrument dispensing request from a customer telephone or customer computer, the bank computer will have to establish communications with the designated instrument dispenser prior to transmitting the dispensing information. Communications may be established, for example, by the bank computer originating a modem-based telephone call which is answered by the designated instrument dispenser.

Once the dispensing information has been transmitted to the appropriate instrument dispenser, the requested instrument may be dispensed, subject to any special instructions regarding the date on which the instrument may be dispensed. When dispensing information is transmitted to a designated instrument dispenser other than a device used to submit the instrument request, dispensing of the instrument will preferably not commence until an authorized recipient has accessed the designated instrument dispenser and requested that the instrument be dispensed. Dispensing of the instrument may include selecting one of a plurality of pre-printed instrument stocks (i.e., a particular paper type) and printing information on that stock such as a date, a payee name, a payee address, an instrument face value, a currency type, an instrument type (e.g., bank check, money order, or traveler's check), a memo, a security mechanism such as an authorization code or a digitized copy of a customer's signature, an account number, an instrument number, and/or any other suitable information.

In some instances, the instrument may be dispensed to someone other than the bank customer. For example, a parent may request that an instrument be dispensed to a child at a school or camp. To provide at least a minimum level of security when instruments are dispensed to persons other than the bank customer, dispensers in preferred embodiments of the present invention may require that a password or personal identification number (PIN) be entered by a potential recipient to obtain the requested negotiable instrument. This password or PIN is preferably selected by the bank customer at the time of generating the instrument request, but alternatively may be selected by the bank computer just prior to giving the authorization notification or may be selected in advance by the bank customer.

Rather than immediately dispensing the negotiable instrument, the bank customer or recipient of the requested instrument may also have the option of deferring dispensing of the instrument until sometime in the future. This may be desirable, for example, in instances where a parent wishes to request in advance a semester's worth of weekly living expense checks for a child away at college, but also wishes to prevent the child from obtaining those checks until a date during that semester that corresponds to each check.

Preferred embodiments of the present invention also permit a bank customer to change an instrument request after the dispensing information is received at a designated instrument dispenser but before the time when an instrument is dispensed. This change may include a cancellation or modification of the instrument request. During this time period, the bank customer may submit a change request to the bank request can be submitted to the bank computer (e.g., using a DTMF tone request using a customer telephone, or a data transmission request using a fixed-location dispenser). This change information may include any of the information in the corresponding dispensing information and preferably includes an account number and an instrument number. Upon a change request being received at a bank computer, the bank computer will determine if the request is authorized. Determining whether a change request is authorized may be based on whether a personal identification number (PIN) entered by the bank customer is authentic, whether the requested instrument has already been dispensed, whether the bank computer is able to establish communication with the designated dispenser, and/or any other suitable criteria. In the event that the change request is denied, a change denial notification will be transmitted to the bank customer. Otherwise, a change authorization notification will be transmitted to the bank customer and change information will be transmitted to the designated instrument dispenser. The change notification is transmitted to the bank customer preferably substantially instantaneously and through the same device through which the change request was submitted. The change information is transmitted to the designated instrument dispenser in substantially the same manner as the dispensing information, may include any of the information in the corresponding dispensing information, and preferably includes an account number and an instrument number. Once this change information is received at the instrument dispenser, the requested negotiable instrument will no longer be available to be dispensed from the instrument dispenser.

After a receive-only dispenser, fixed-location dispenser, or portable, hand-held dispenser has been used to request and/or dispense a negotiable instrument, a bank customer or instrument recipient may download data regarding request and/or dispensing information to a personal computer, printer, and/or any other suitable device using an external device interface in each of the dispensers. This data preferably includes all of the data communicated between the instrument dispenser and the bank computer. Once downloaded, this data may preferably be used to generate reports and bookkeeping entries.

A preferred embodiment of a system 30 for requesting and dispensing negotiable instruments is illustrated in FIG. 1. As shown, system 30 comprises a bank computer 32, a bank computer terminal 34, a bank telephone 36, a communication network 40, a wireless network 42, a customer telephone 44, a customer computer 45, a receive-only dispenser 46, a fixed-location dispenser 48, and a portable, hand-held dispenser 50. Generally speaking, a request to receive a negotiable instrument is made by a bank customer using customer telephone 44, customer computer 45, fixed-location dispenser 48, or portable, hand-held dispenser 50.

Using customer telephone 44, a bank customer may request an instrument by voice or by using keys on customer telephone 44 to generate DTMF tones. Customer telephone 44 may be located anywhere in the world, may be a traditional or wireless telephone, and may be connected to bank computer 32 or bank telephone 36 via a traditional telephone system, a wireless telephone system, and/or any other suitable communication network.

Using a customer computer 45, a bank customer may request an instrument by sending a data transmission request to bank computer 32 via a direct telephone connection, a computer network connection, an Internet connection, or any other suitable connection, using a terminal emulator, a web browser, dedicated banking software, or any other suitable piece of software.

Using a fixed-location dispenser 48 or portable, hand-held dispenser 50, a bank customer may request an instrument by voice or by using keys on dispenser 48 or 50 to generate DTMF tones when the dispenser 48 or 50 is being operated as a telephone or being operated in an interactive voice mode. Using a fixed-location dispenser 48 or portable, hand-held dispenser 50, a bank customer may also request an instrument by sending data transmissions from dispenser 48 or 50 when the dispenser is operating in a non-interactive mode or an interactive data mode. Fixed-location dispenser 48 and portable, hand-held dispenser 50 may be connected to bank computer 32 or bank telephone 34 via a traditional telephone system, a wireless telephone system, a computer network connection, an Internet connection, and/or any other suitable communication network.

Upon a request being generated, the request is then transmitted over communication network 40, and possibly wireless network 42, to bank computer 32. Communication network 40 may include telephone systems, computer networks, the Internet, and/or any other suitable communication networks. Wireless network 42 may include wireless telephone systems, radio communication systems, satellite communication systems, and/or any other suitable wireless communication networks. DTMF tone and data transmission requests are preferably directly entered into bank computer 32 from communication network 40. For voice requests made using customer telephone 44, fixed-location dispenser 48, or portable, hand-held dispenser 50, a bank employee may be used to enter the request into bank computer 32 via bank telephone 36 and bank computer terminal 34. Alternatively, a suitable voice recognition system in bank computer 32 may be used to input the voice request directly into bank computer 32.

After an instrument request is received, bank computer 32 then determines whether the request is authorized. This determination may be based upon the value of the instrument requested, the available balance or credit in the customer's account, whether a personal identification number (PIN) entered by the bank customer is authentic, the number or value of previously made requests, and/or any other suitable criteria. Once the determination is made, a notification is sent from the bank computer 32 to the bank customer at the customer telephone 44, customer computer 45, fixed-location dispenser 48, or portable, hand-held dispenser 50 over communication network 40, and possibly wireless network 42. This notification is preferably given substantially instantaneously and in the same way in which the instrument request was submitted. For example, for voice requests made by a bank customer to a bank employee using a customer telephone 44, a notification may be communicated to the bank customer by first displaying the notification on bank computer terminal 34, and then having the bank employee read the notification to the bank customer.

If the request is authorized, dispensing information will then also be transmitted to a designated instrument dispenser. This dispenser may be a receive-only dispenser 46 or the same or a different fixed-location dispenser 48 or a portable, hand-held dispenser 50 from which the instrument request may have been submitted. As with the authorization or denial notification, the dispensing information is transmitted over communication network 40, and possibly wireless network 42.

Once the dispensing information has been received, an instrument may be dispensed at the designated instrument dispenser. In preferred embodiments of the present invention, the recipient of the negotiable instrument, who may also be the bank customer, may be asked whether the recipient would like the instrument to be dispensed immediately or to be dispensed at a later point in time. The preferred embodiments of the present invention also permit the requesting bank customer, who may not be the intended recipient of the instrument, to designate the earliest point in time at which an instrument may be dispensed from an instrument dispenser.

A bank customer may also request that an instrument waiting to be dispensed from a designated instrument dispenser be changed. This change may include cancellation or modification of the instrument, and may be requested from a customer telephone 44, a customer computer 45, a fixed-location dispenser 48, or a portable, hand-held dispenser 50. Like instrument requests, this change request is then transmitted over communication network 40, and possibly wireless network 42, to bank computer 32. As with instrument requests, change requests made by voice may be transmitted to bank computer 32 via a bank employee using bank telephone 36 and bank computer terminal 34. Alternatively, voice change requests may be entered into bank computer directly by a suitable voice recognition system.

After a change request has been received, bank computer 32 verifies the identity of the bank customer issuing the change request and contacts the designated instrument dispenser. If the identity of the bank customer is verified and the instrument is waiting to be dispensed from the designated instrument dispenser 46, 48, or 50, bank computer 32 will transmit a change authorization notification to customer telephone 44, customer computer 45, fixed-location dispenser 48, or portable, hand-held dispenser 50 from which the change request was made, and will transmit change information to designated instrument dispenser 46, 48, or 50. This change information may include any of the information in the corresponding dispensing information and preferably includes an account number and an instrument number. Once the change information has been received at designated instrument dispenser 46, 48, or 50, the corresponding original instrument will no longer be available to be dispensed from the instrument dispenser. If, however, the identity of the bank customer cannot be verified, the instrument has been dispensed, or the bank computer 32 cannot communicate with the designated instrument dispenser 46, 48, or 50, a change denial notification will be transmitted to the bank customer and the instrument request will not be canceled or modified.

Figure 2:
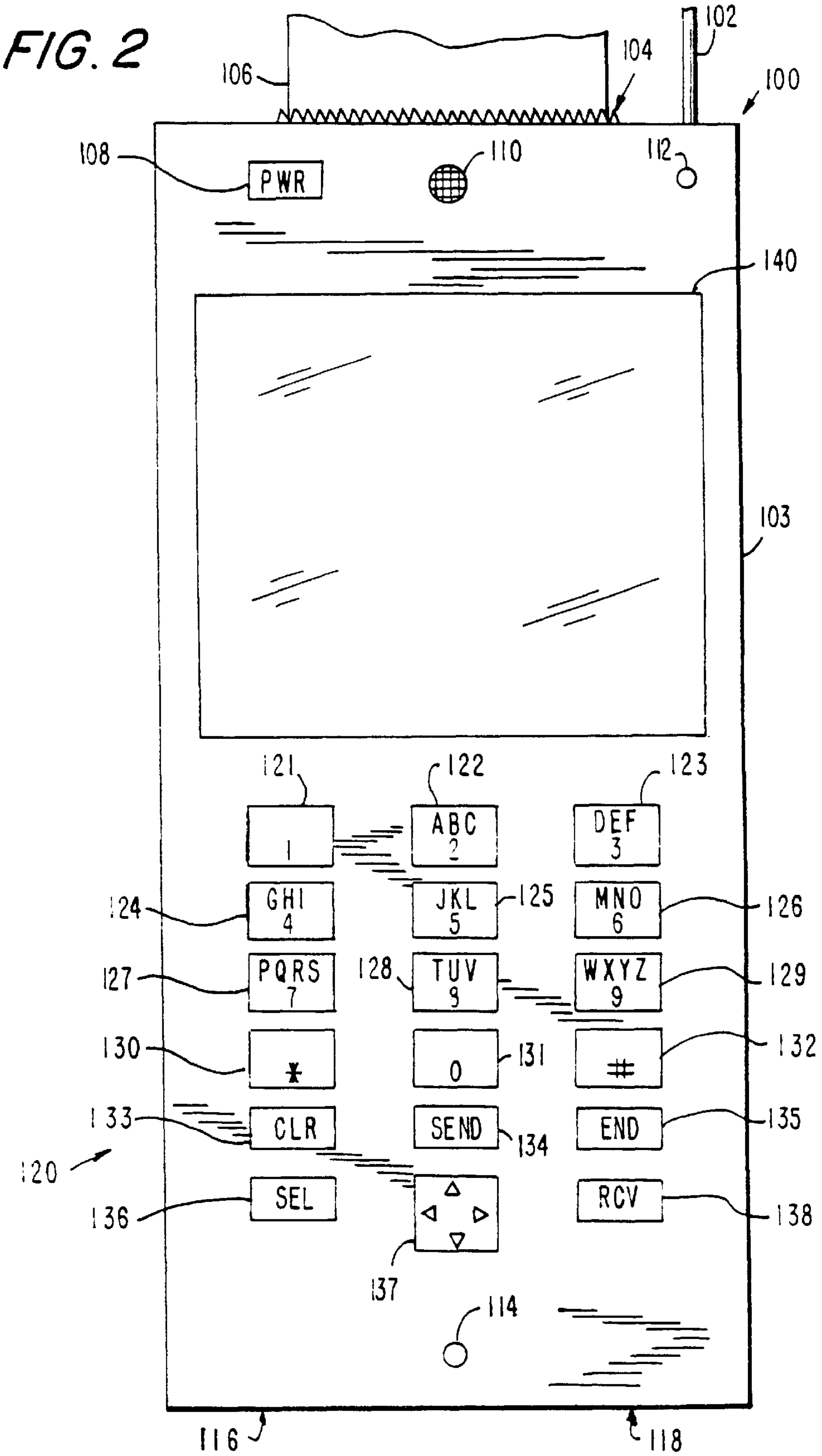
FIG. 2 is a front view of a portable, hand-held dispenser in accordance with the present invention.
Figure 3:
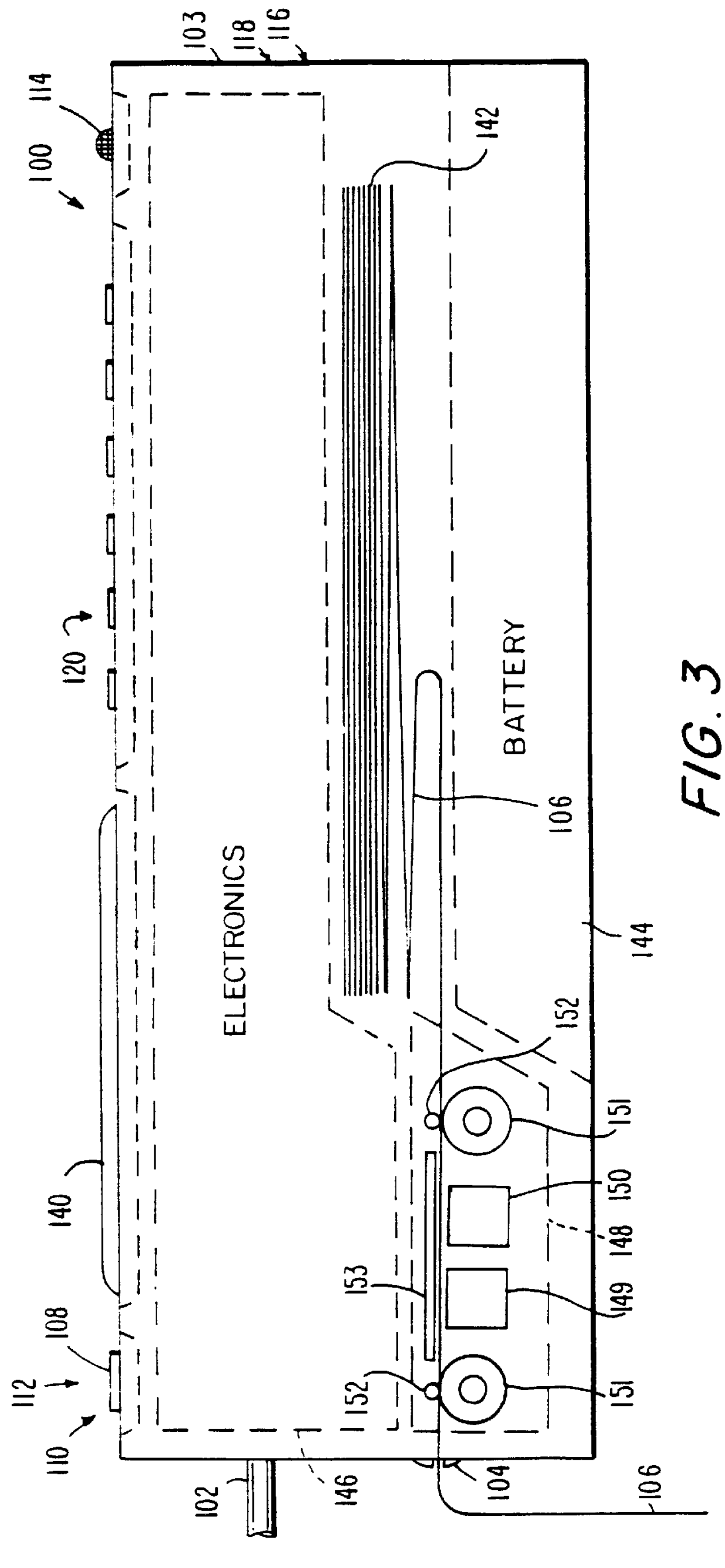
FIG. 3 is a side view, partly in section, of one embodiment of a portable, hand-held dispenser having a fan-fold negotiable instrument supply in accordance with the present invention.
Figure 4:
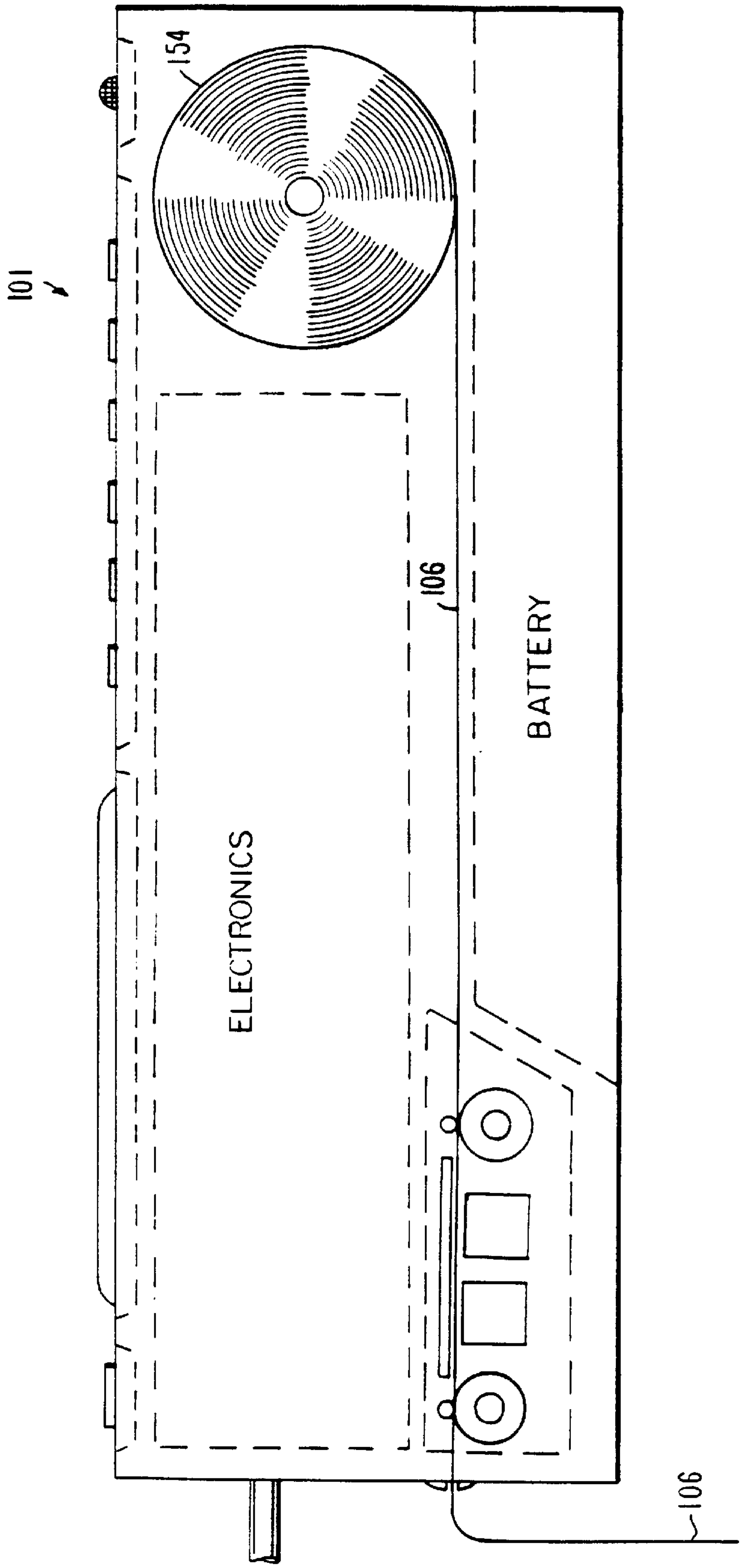
FIG. 4 is a side view, partly in section, of another embodiment of a portable, hand-held dispenser having a roll negotiable instrument supply in accordance with the present invention.

FIGS. 2, 3, and 4 illustrate an embodiment 100 of a portable, hand-held dispenser 50. As shown in FIG. 2, all components of portable, hand-held dispenser 100 are housed within a body 103 that is preferably formed from plastic, but may also be formed from aluminum or any other suitable material. Located on the top of body 103 are an antenna 102, a dispensing slot 104, and negotiable instruments 106, and on the bottom of body 103 are an external power input 116 and an external device interface connector 118. Antenna 102 is a radio frequency antenna that enables portable, hand-held dispenser 100 to communicate with wireless network 42 (FIG. 1), and is preferably flexible and telescopic. Alternatively to providing an antenna 102 in portable, hand-held dispenser 100, portable, hand-held dispenser 100 may incorporate a telephone jack (not shown) that may be used to connect portable, hand-held dispenser 100 to a standard telephone wall outlet (not shown). Dispensing slot 104 includes a narrow opening in body 103 through which an instrument 106 can pass and a serrated edge that is preferably formed from a light metal such as aluminum or any other suitable material and that may be used to tear off instruments from portable, hand-held dispenser 100. Although dispensing slot 104 is illustrated as being positioned at the top of body 103, dispensing slot 104 may be positioned on the bottom, front, back, or any other suitable position on body 103. Instruments 106 may be any type of negotiable instrument and are preferably preprinted, thermally-printable paper forms that may be recognized as a traveler's check, a money order, or a bank check. For security purposes, instruments 106 preferably incorporate a water mark, micro-printing, or any other suitable anti-counterfeiting mechanism.

External power input 116 may be used to connect an external source of power such as a 110 VAC line cord, a 12 VDC automobile cigarette lighter adapter cord, or any other suitable external power source to portable, hand-held dispenser 100. External device interface connector 118 may be used to connect portable, hand-held dispenser 100 to an external device such as a computer, a printer, or any other suitable external device and may be an electrical connector, an optical connector, or any other suitable type of connector or combination of connectors. As stated above, this connection may be used, for example, to download data from portable, hand-held dispenser 100 to a computer, printer, or other suitable device.

Located on the front of body 103 are a power button 108, a speaker 110, a power indicator 112, a display 140, a keypad 126, and a microphone 114. Power button 108 is used to toggle the power of portable, hand-held dispenser 100 between on and off states. Speaker 110 is used to enable a user of portable, hand-held dispenser 100 to hear a telephone line when portable, hand-held dispenser 100 is being used to make a telephone call for a regular voice telephone call or for requesting an instrument in an interactive-voice mode. Power-on indicator 112 is used to indicate the power state of portable, hand-held dispenser 100, is illuminated when the power state is on, and preferably is a low-power light emitting diode (LED), although any other suitable indicator could be used. Display 140 is used to display menu options, messages, settings, prompts, telephone numbers, and any other desired information. Display 140 is preferably a back-lit liquid crystal display (LCD), however, any other suitable display could also be used. Microphone 114 is used to enable a user of portable, hand-held dispenser 100 to speak on a telephone line when portable, hand-held dispenser 100 is being used to make a telephone call for a regular voice telephone call or for requesting an instrument in an interactive-voice mode.

When the power of portable, hand-held dispenser 100 is turned-on, power indicator 112 will illuminate and, preferably, display 140 will present a main menu of options from which the bank customer can select how to use portable, hand-held dispenser 100. For example, menu options may allow the customer to use the portable, hand-held dispenser as a telephone, to initiate an interactive-voice-mode instrument request, to initiate an interactive-data-mode instrument request, to initiate a non-interactive-mode instrument request, to print an instrument stored in portable, hand-held dispenser 100, to change an instrument requested but not dispensed, and to configure the settings of portable, hand-held dispenser 100. As another example, a fast cash menu option may be provided which, upon selection, automatically requests a traveler's check (or any other type of negotiable instrument) for a predetermined amount that is to be dispensed from portable, hand-held dispenser 100 using data setup in the portable, hand-held dispenser 100. Of course, other menu options could also be available to the customer without departing from the spirit and scope of the present invention.

Keypad 120 enables a user to control the operation of portable, hand-held dispenser 100. Keypad 120 includes a one ("1") key 121, a two ("2," "a," "b," or "c") key 122, a three ("3," "d," "e," or "f") key 123, a four ("4," "g," "h," or "i") key 124, a five ("5," "j," "k," or "l") key 125, a six ("6," "m," "n," or "o") key 126, a seven ("7," "p," "q," "r," or "s") key 127, an eight ("8," "t," "u," or "v") key 128, a nine ("9," "w," "x," "y," or "z") key 129, a star ("*") key 130, a zero ("0") key 131, a pound key ("#") 132, a clear ("clr") key 133, a send key 134, an end key 135, a select ("sel") key 136, a cursor (up, down, left, and right arrows) key 137, and a receive ("rcv") key 138. Number keys one through nine and zero 121–129 and 131, star key 130, and pound key 132 may be used to dial telephone numbers, to select menu options, to respond to prompts, and to perform any other function for which these keys are suitable. To facilitate the use of telephone banking systems, and other DTMF tone based response systems, pressing any of keys 121–132 will cause the corresponding DTMF tone to be generated on the telephone line. For example, to request that an instrument be sent to portable, hand-held dispenser 100, or any other dispenser 46, 48, or 50 (FIG. 1), a bank customer may use portable, hand-held dispenser 100 to place a telephone call to a telephone banking system and enter the request information using DTMF tones. Clear key 133 may be used to delete part or all of an entered telephone number, menu option selection, prompt response, or any other user-entered information. Send key 134 may be used to initiate a telephone call once a user has entered a telephone number. End key 135 may be used to terminate a telephone call once the call has been completed.

Select key 136 may be used to accept a menu option selection, prompt response, or any other suitable information once entered or displayed on display 140. Cursor key 137 may be used to navigate menus that may be displayed on display 140 of portable, hand-held dispenser 100, and is preferably a four direction key that may be pressed in the up, down, left, and right directions to generate four unique switch outputs. When a menu is displayed, pressing cursor key 137 may cause the menu to be scrolled with respect to a highlighted cursor region on display 140. In this way, the bank customer can highlight and then select (using select key 136) any of the menu options. Finally, receive key 138 is used to activate a modem internal to portable, hand-held dispenser 100 when a user is ready to receive data during a telephone call. While this modem is activated, speaker 110 and microphone 114 are preferably deactivated, and number keys 121–129 and 131, star key 130, and pound key 132 preferably do not produce DTMF tones. Power button 108 and keys 121–138 are preferably push-button, momentary-contact switches, but may alternatively be any suitable switch.

A side-layout view of portable, hand-held dispenser 100 is illustrated in FIG. 3. As shown in FIGS. 2 and 3, antenna 102, dispensing slot 104, instruments 106, power button 108, speaker 110, power indicator 112, display 140, keypad 120, and microphone 114, external power input 116, and external device interface connector 118 are located on the outside top, front, and bottom of body 103 of portable, hand-held dispenser 100 and perform the functions described above. On the inside of body 103 of portable, hand-held dispenser 100 are electronics 146, a battery 144, a printer 148, a fan-fold negotiable instrument supply 142, and instruments 106. Electronics 146 provide the communication, processing, control, input, output, and power circuits for portable, hand-held dispenser 100, and preferably include a radio frequency transceiver, a modem, memory, a microprocessor, a printer controller, a display controller, an audio controller, a keypad controller, an external device interface, and a power supply. Battery 144 is used as a source of power for electronics 146 and other components requiring power in portable, hand-held dispenser 100. Battery 144 is preferably a nickel metal hydride battery or nickel cadmium battery, although any other suitable type of battery or batteries could also be used, and may be removed from the back of portable, hand-held dispenser 100 while being recharged so as to allow another battery 144 to be installed.

Printer 148 is used to print instruments 106 that are dispensed by portable, hand-held dispenser 100. Printer 148 includes print head 149, alignment head 150, drive rollers 151, drive pins 152, and backing plate 153. Print head 149 is used to print on instruments 106 all or only a part of the information and other markings indicated on a dispensed instrument 106. Print head 149 is preferably a thermal print head that remains in fixed position and spans the width of instrument 106. Alternatively, any other suitable type of print head 149 could also be used, and print head 149 could be less than the full width of instrument 106 and/or capable of moving along the width of instrument 106 along one or more rails (not shown) under the power of a print head drive motor (not shown). Alignment head 150 is used to align instruments 106 as they are fed from instrument supply 142 so that any printed information lines up with any preprinted markings on instruments 106. Alignment head 150 may be an optical, magnetic, mechanical, or any other suitable sensor, and may detect pre-printed markings, holes, or any other suitable indicator on instruments 106.

Drive rollers 151 and drive pins 152 move instruments 106 from instrument supply 142 past print head 149 and through dispensing slot 104. Drive rollers 151 and drive pins 152 are preferably driven by a low power electric motor (not shown), and may be any suitable mechanism for moving instruments 106 as indicated. Backing plate 153 is used to maintain instruments 106 in contact with or in close proximity to print head 149 and alignment head 150. Backing plate 153 is preferably plastic and runs the width of instrument 106 and the length between print head 149 and alignment head 150, although any other suitable material and size could also be used.

Fan-fold instrument supply 142 is used to supply negotiable instruments 106 that are dispensed by portable, hand-held dispenser 100. As described above in connection with the description of negotiable instruments 106 in FIG. 2, negotiable instruments 106 in fan-fold instrument supply 142 may be any type of negotiable instrument and are preferably preprinted, thermally-printable paper forms that may be recognized as traveler's checks, money orders, or bank checks. For security purposes, negotiable instruments 106 preferably incorporate a water mark, micro-printing, or any other suitable anti-counterfeiting mechanism. Fan-fold negotiable instrument supply 142 preferably incorporates negotiable instruments 106 into a continuous length of connected negotiable instruments which are perforated between each other to allow them to fold into a compact stack. Alternatively, to using a fan-fold negotiable instrument supply 142 to provide negotiable instruments 106 as shown in FIG. 3, a roll negotiable instrument supply 154, as shown in FIG. 4, or any other suitable instrument supply, could be used in portable, hand-held dispenser 101. To load either fan-fold negotiable instrument supply 142 or roll negotiable instrument supply 154, a user preferably removes battery 144 from the back of portable, hand-held dispenser 100, removes any negotiable instruments 106 in dispenser 100, inserts a new negotiable instrument supply 142 or 154 into dispenser 100, manually feeds a negotiable instrument 106 into printer 148, and replaces battery 144.

Figure 5:
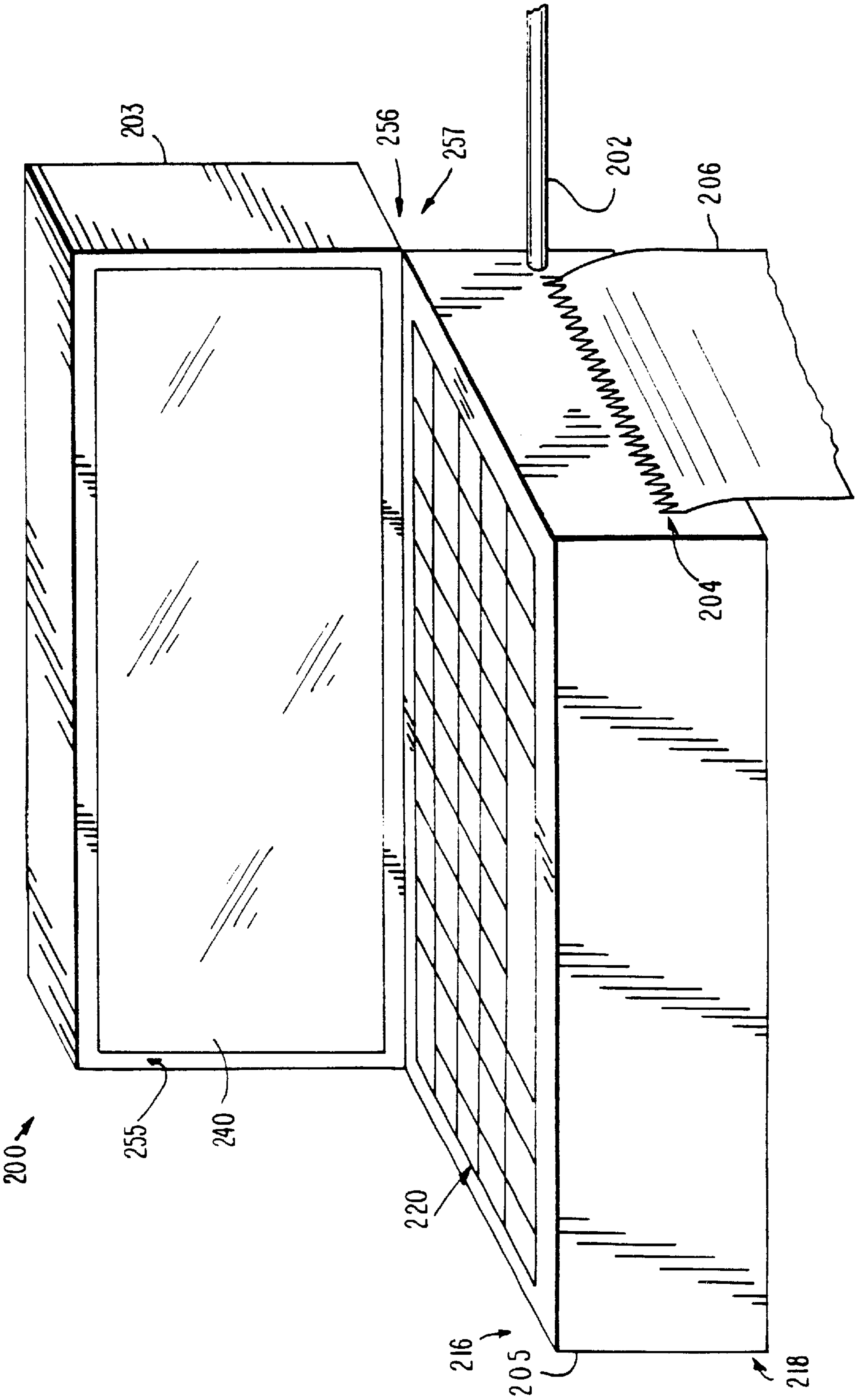
FIG. 5 is a perspective view of an organizer-style, portable, hand-held dispenser (with its top open) in accordance with the present invention.

FIGS. 5, 6, 7, and 8 illustrate an alternate embodiment 200 of portable, hand-held dispenser 50 (FIG. 1) of the present invention. As shown in FIG. 5, portable, hand-held dispenser 200 resembles a hand-held organizer and may include functions such as a telephone directory, a word processor, a memo pad, a reminder, a scheduler, a calender, and a calculator. Portable, hand-held dispenser 200 includes a top body portion 203, a bottom body portion 205, and a hinge 256 which connects the top body portion 203 to the bottom body portion 205 and allows the body portions 203 and 205 to be folded adjacent to each other (i.e., closed) or to be opened as illustrated. A flexible ribbon cable 257 is incorporated into hinge 256 to allow the circuitry in top body portion 203 to be connected to circuitry in bottom body portion 205. A display 240 is located on the inside face 255 of top body portion 203. Display 240 is used to display menu options, prompts, and information to a user of hand held dispenser 200. Display 240 is preferably a back-lit liquid crystal display (LCD), although any other suitable display could be used.

Bottom body portion 205 includes an antenna 202, a dispensing slot 204, instruments 206, an external power input 216, an external device interface 218, and a keypad 220. Antenna 202, dispensing slot 204, instruments 206, external power input 216, and external device interface connector 218 are substantially the same as antenna 102, dispensing slot 104, instruments 106, external power input 116, and external device interface connector 118, respectively, that are described above in connection with FIG. 2. Keypad 220 preferably includes all of the letters, numbers, and characters of a full type-writer style keyboard and provides the user with control over the operation of portable, hand-held dispenser 200 being used as an organizer or an instrument dispenser. Keypad 220 may be any suitable style of keypad, such as a membrane keypad.

Figure 6:
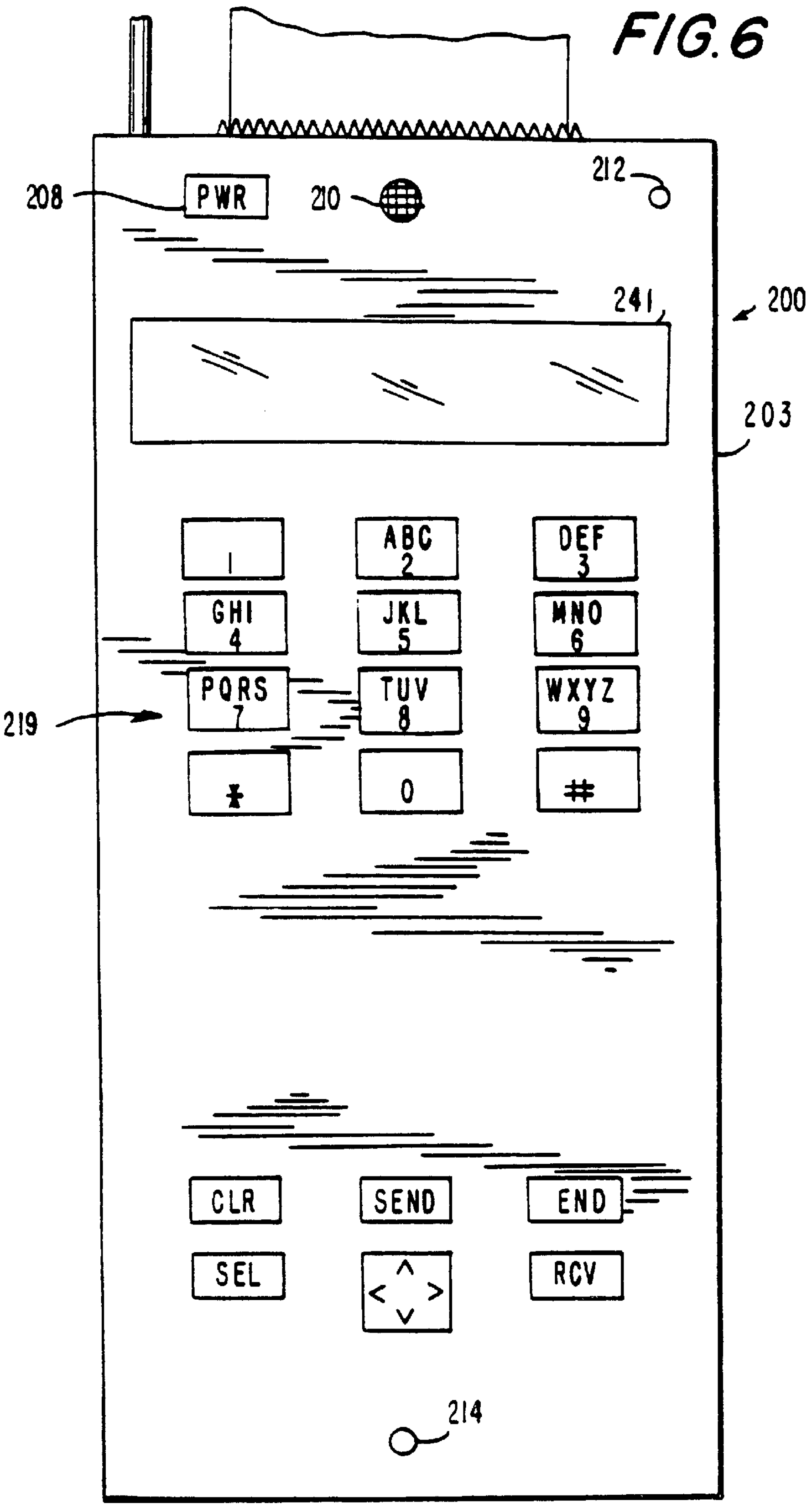
FIG. 6 is a top view of an organizer-style, portable, hand-held dispenser (with its top closed) in accordance with the present invention.

The top of top body portion 203 of portable, hand-held dispenser 200 is illustrated in FIG. 6. As shown, the top of top body portion 203 incorporates components that enable portable, hand-held dispenser 200 to be used as a telephone when the body portions 203 and 205 (FIG. 5) are in a closed position. These components include a power button 208, a speaker 210, a power indicator 212, a keypad 219, a microphone 214, and a display 241. Power button 208, speaker 210, power indicator 212, keypad 219, and microphone 214 are substantially the same as power button 108, speaker 110, power indicator 112, keypad 120, and microphone 114, respectively, that are described above in connection with FIG. 2. Display 241 is used to display telephone numbers, menu options, prompts, and any other suitable information when portable, hand-held dispenser 200 is being used as a telephone or an instrument dispenser. Display 241 is preferably a back-lit liquid crystal display (LCD), although any other suitable display could also be used. Although these components are illustrated as being incorporated into the top of top body portion 203, they could alternatively be incorporated into the bottom of bottom body portion 205. In such an implementation, a battery 244 (which is illustrated in FIG. 7) would preferably be located in top body portion 203.

Figure 7:
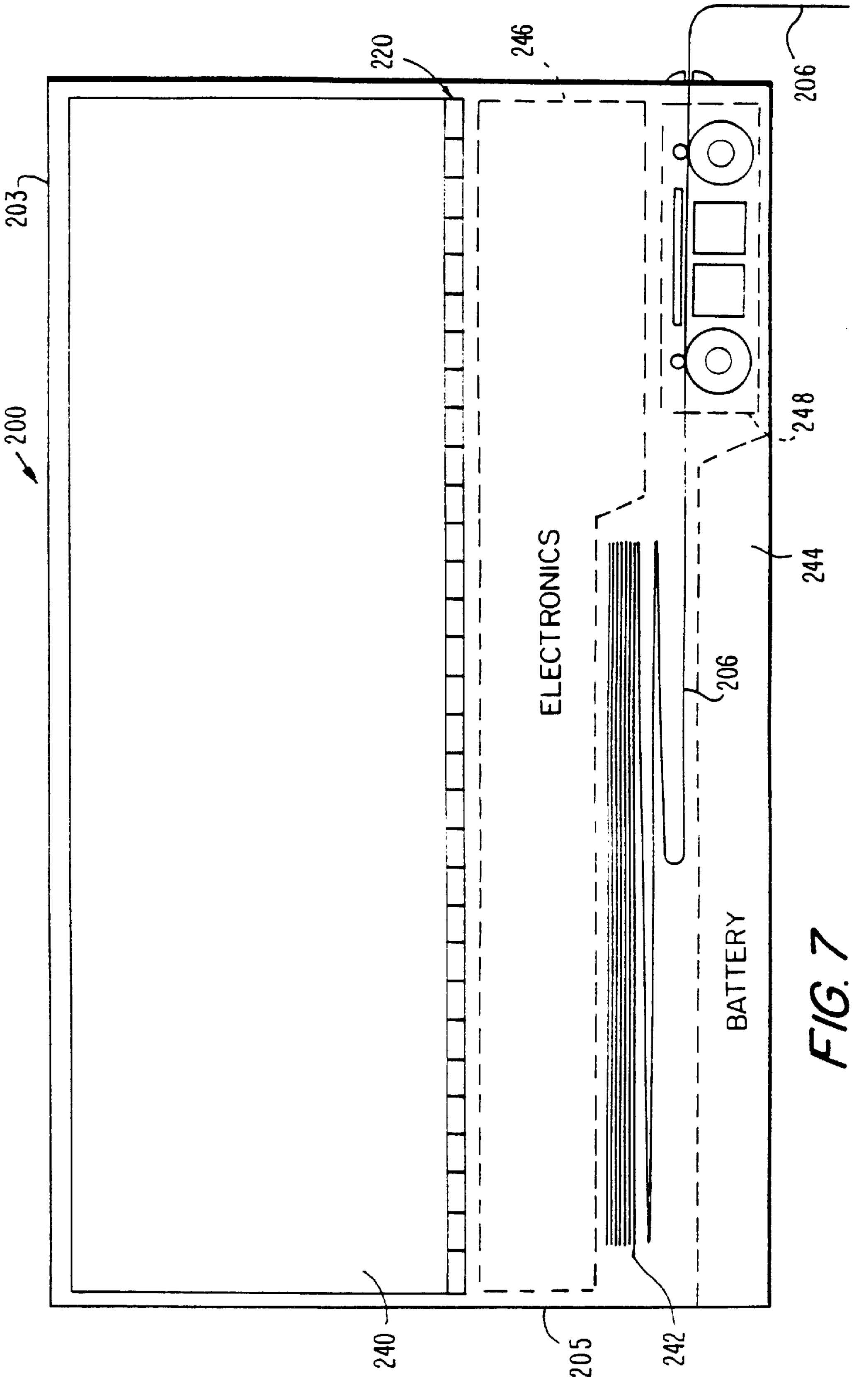
FIG. 7 is a front view, partly in section, of one embodiment of an organizer-style, portable, hand-held dispenser (with its top open) having a fan-fold negotiable instrument supply in accordance with the present invention.
Figure 8:
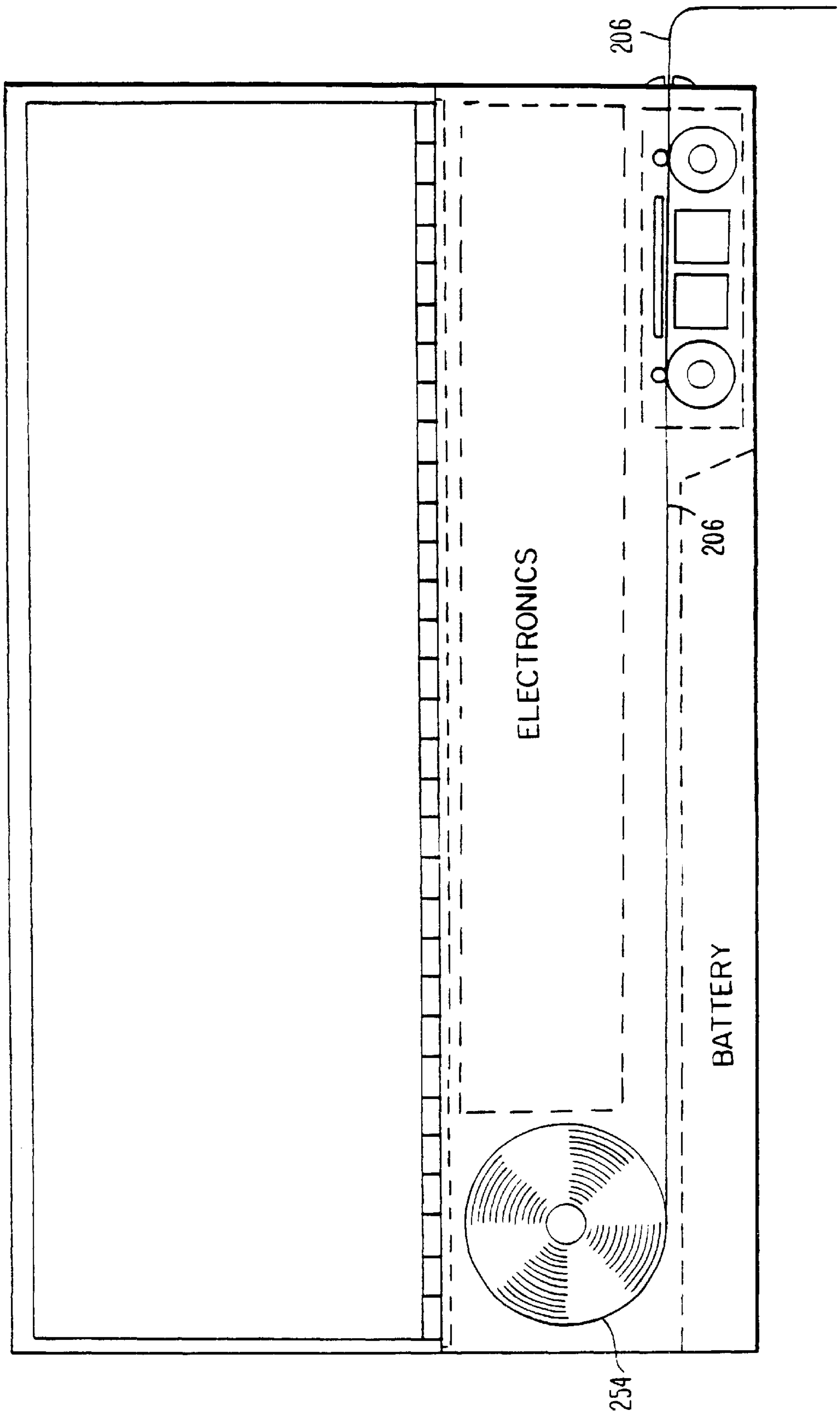
FIG. 8 is a front view, partly in section, of another embodiment of an organizer-style, portable, hand-held dispenser (with its top open) having a roll instrument supply in accordance with the present invention.

FIG. 7 illustrates a side-layout view of portable, hand-held dispenser 200 showing top body portion 203, display 240, bottom body portion 205, keypad 220, and instruments 206. As also shown, bottom body portion 205 incorporates electronics 246, a fan-fold instrument supply 242, instruments 206, a printer 248, and a battery 244. Electronics 246, fan-fold instrument supply 242, instruments 206, printer 248, and battery 244 are substantially the same as electronics 146, fan-fold instrument supply 142, instruments 106, printer 148, and battery 144, respectively, that are described above in connection with FIG. 3. Alternatively to using a fan-fold instrument supply 242 to provide instruments 206 as shown in FIG. 7, a roll instrument supply 254, as shown in FIG. 8, or any other suitable instrument supply, could be used in portable, hand-held dispenser 200. To load either fan-fold instrument supply 242 or roll instrument supply 254, a user preferably removes battery 244 from the bottom of portable, hand-held dispenser 200, removes any instruments 206 in dispenser 200, inserts a new instrument supply 242 or 254 into dispenser 200, manually feeds an instrument 206 into printer 248, and replaces battery 244.

Although FIGS. 2–8 illustrate portable, hand-held dispensers 100 and 200 in forms that resemble a portable telephone and a personal organizer, the present invention could be implemented in any device that enables a bank customer to request and dispense a negotiable instrument. For example, portable, hand-held dispensers 100 and 200 could be implemented in a palm-top computer, a lap-top computer, a portable, pen-based computer, or any other suitable, portable electronic device.

Figure 9:
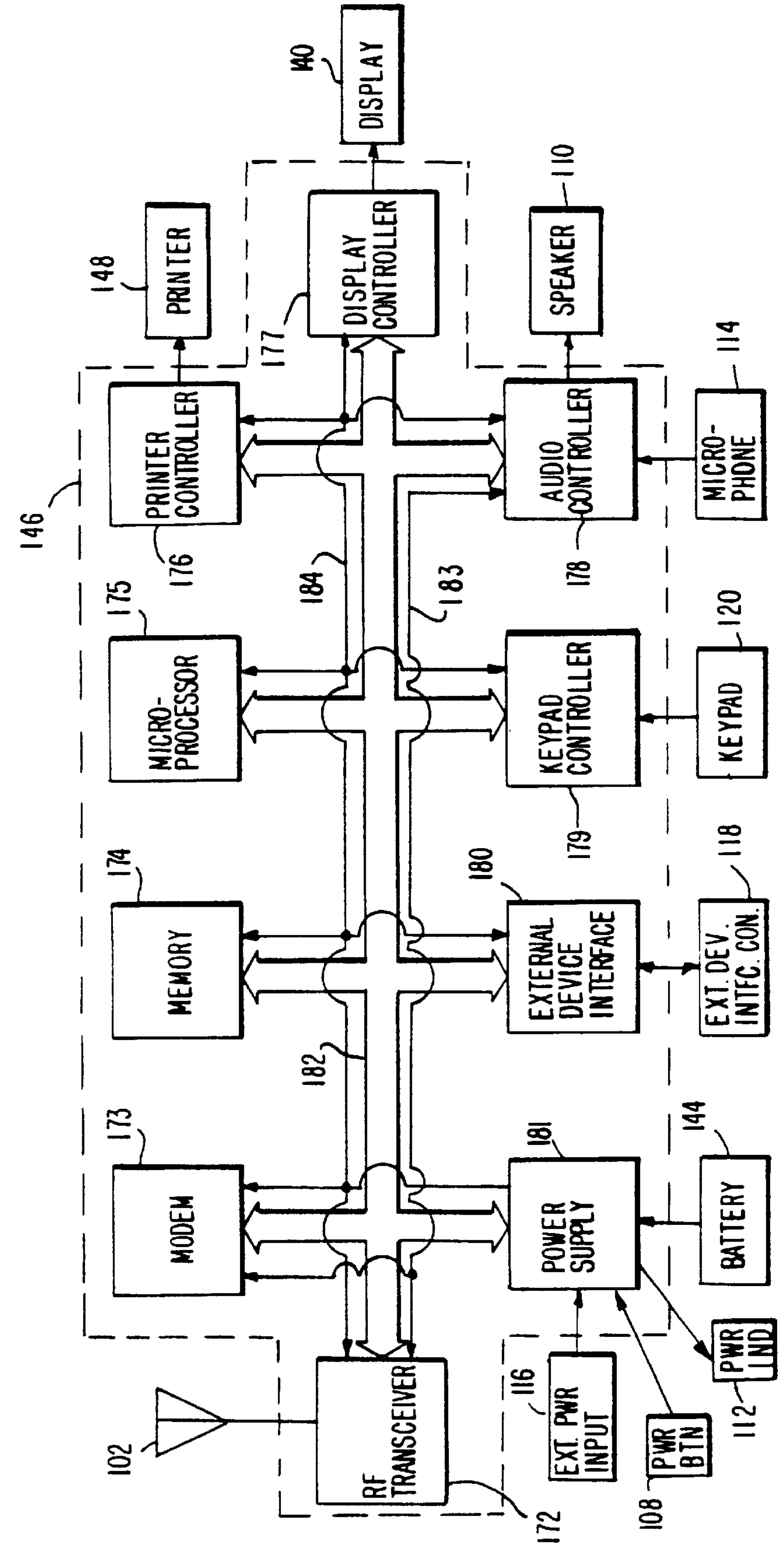
FIG. 9 is a block diagram of an illustrative portable, hand-held dispenser in accordance with the present invention.

FIG. 9 shows a block diagram of preferred embodiments of portable, hand-held dispenser 100. Although FIG. 9 is illustrated for portable, hand-held dispenser 100, the block diagram of this figure is generally applicable to portable, hand-held dispenser 200 as well. As illustrated, portable, hand-held dispenser 100 comprises antenna 102, electronics 146, printer 148, display 140, speaker 110, microphone 114, keypad 120, external device interface connector 118, power indicator 112, battery 144, power button 108, and external power input 116. These components are described above in connection with FIGS. 2 and 3. More particularly, electronics 146 comprise a radio frequency (RF) transceiver 172, a modem 173, memory 174, a microprocessor 175, a printer controller 176, a display controller 177, an audio controller 178, a keypad controller 179, an external device interface 180, a power supply 181, a data/address bus 182, a power bus 184, and an audio bus 183.

The central control of electronics 146 is performed by microprocessor 175. Microprocessor 175 executes software instructions that enable it to receive inputs from other components in electronics 146, processes these inputs, and send outputs to the other components in electronics 146. Microprocessor 175 may be any suitable microprocessor, microcontroller, or any other device capable of receiving inputs, processing those inputs, and generating outputs. Memory 174 is used to store data and software for microprocessor 175 and other components of electronics 146. Memory 174 may include random access memory (RAM), read only memory (ROM), programmable read only memory (PROM), erasable programmable read only memory (EPROM), electrically erasable programmable read only memory (EEPROM), flash memory, and/or any other suitable memory or combination of memories.

Keypad controller 179 monitors inputs from keypad 120, buffers those inputs, and generates interrupts to microprocessor 175 when those inputs have been received. Audio controller 178 controls the audio output signals sent to speaker 110 and the audio input signals received from microphone 114. Audio output and input signals may be sent between audio controller 178 and RF transceiver 172 over audio bus 183. Audio output and input signals may also be sent between audio controller 183 and microprocessor 175 over address/data bus 182. These audio output and input signals may be telephone conversation signals, DTMF tones, or indicator tones, and/or any other audio signals. Display controller 177 receives inputs from microprocessor 175 and drives display 140. Printer controller 176 receives inputs from microprocessor 175, and controls the feeding, alignment, and printing of instruments 106 (FIGS. 2–4) by printer 148.

RF transceiver 172, modem 173, and external device interface 180 all enable electronics 146 to communicate with external equipment. RF transceiver 172 is a combined transmitter and receiver that preferably enables electronics 146 to communicate with a wireless network 42 (FIG. 1). This wireless network 42 (FIG. 1) may be a cellular phone system, a wireless radio network, a satellite communication network, or any other suitable wireless communication network, or combination of networks. Alternatively to implementing electronics 146 with an RF transceiver 172, electronics 146 could be implemented with a telephone transceiver (not shown) that would enable electronics 146 to communicate over a standard telephone line by being connected to the telephone line through a telephone jack (not shown) which would replace antenna 102.

Modem 173 enables electronics 146 to transmit and receive data from a bank computer 32 (FIG. 1), other computers, network access servers, facsimile machines, and any other modem compatible equipment. Modem 173 is preferably a 56 kilo-baud modem, although any other suitable modem may be used. Modem 173 communicates with RF transceiver 172 over audio bus 183 and communicates with microprocessor 175 over address/data bus 182.

External device interface 180 enables electronics 146 to communicate with external printers, computers, and any other suitable equipment, through external device interface connector 118. External device interface 180 is preferably a serial interface, although a parallel interface, an optical interface, or any other suitable interface or combination of interfaces could be used.

Finally, power supply 181 provides power rectification and regulation, power monitoring, microprocessor 175 watchdog, power button 108 monitoring, and power indicator 112 drive functions. Power supply 181 provides power to each of the electronic circuits of portable, hand-held dispenser 100 through power bus 184. Power supply 181 receives power from battery 144 and/or external power input 116. Whenever power button 108 is depressed, power supply 181 buffers the input depression and sets the power state of portable, hand-held dispenser 100 to the appropriate state, and illuminates or extinguishes power indicator 112 accordingly. When turning power off, power supply 181 may request that a power down sequence be executed by microprocessor 175.

Figure 10:
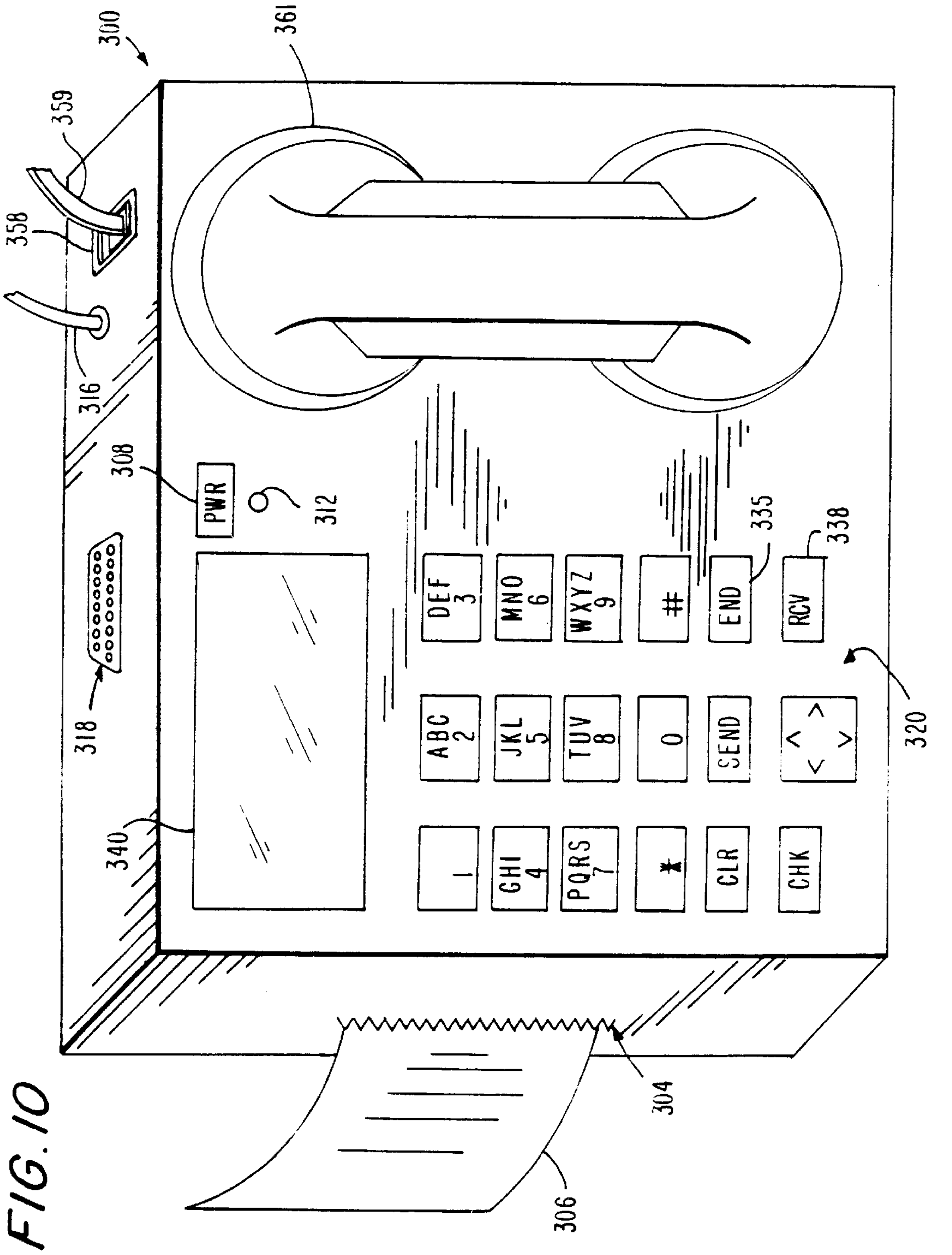
FIG. 10 is a perspective view of a fixed-location dispenser in accordance with the present invention.

A preferred embodiment 300 of a fixed-location dispenser 48 is illustrated in FIG. 10. As shown fixed-location dispenser 300 comprises a display 340, a keypad 320, a power button 308, a power indicator 312, a hand set 361, an external device interface connector 318, an external power input 316, a telephone jack 358, a telephone line cord 359, a dispensing slot 304, and instruments 306. Display 340 is used to present menu options, prompts, telephone numbers, and/or any other suitable information to a user of fixed-location dispenser 300. Display 340 is preferably a back-lit liquid crystal display, although any suitable display may be used. Keypad 320, power button 308, power indicator 312, dispensing slot 304, instruments 306, external power input 316, and external device interface connector 318 are substantially the same as keypad 120, power button 108, power indicator 112, dispensing slot 104, instruments 106, external power input 116, and external device interface connector 118, respectively, that are described above in connection with FIG. 2. Hand set 361 allows a user to operate fixed-location dispenser 300 as a telephone. Hand set 361 incorporates a microphone (not shown) and a speaker (not shown) like a traditional telephone hand set. Telephone jack 358 and telephone line cord 359 are used to connect fixed-location dispenser 300 to a standard telephone wall outlet, and may be any suitable telephone jack and line cord.

Figure 11:
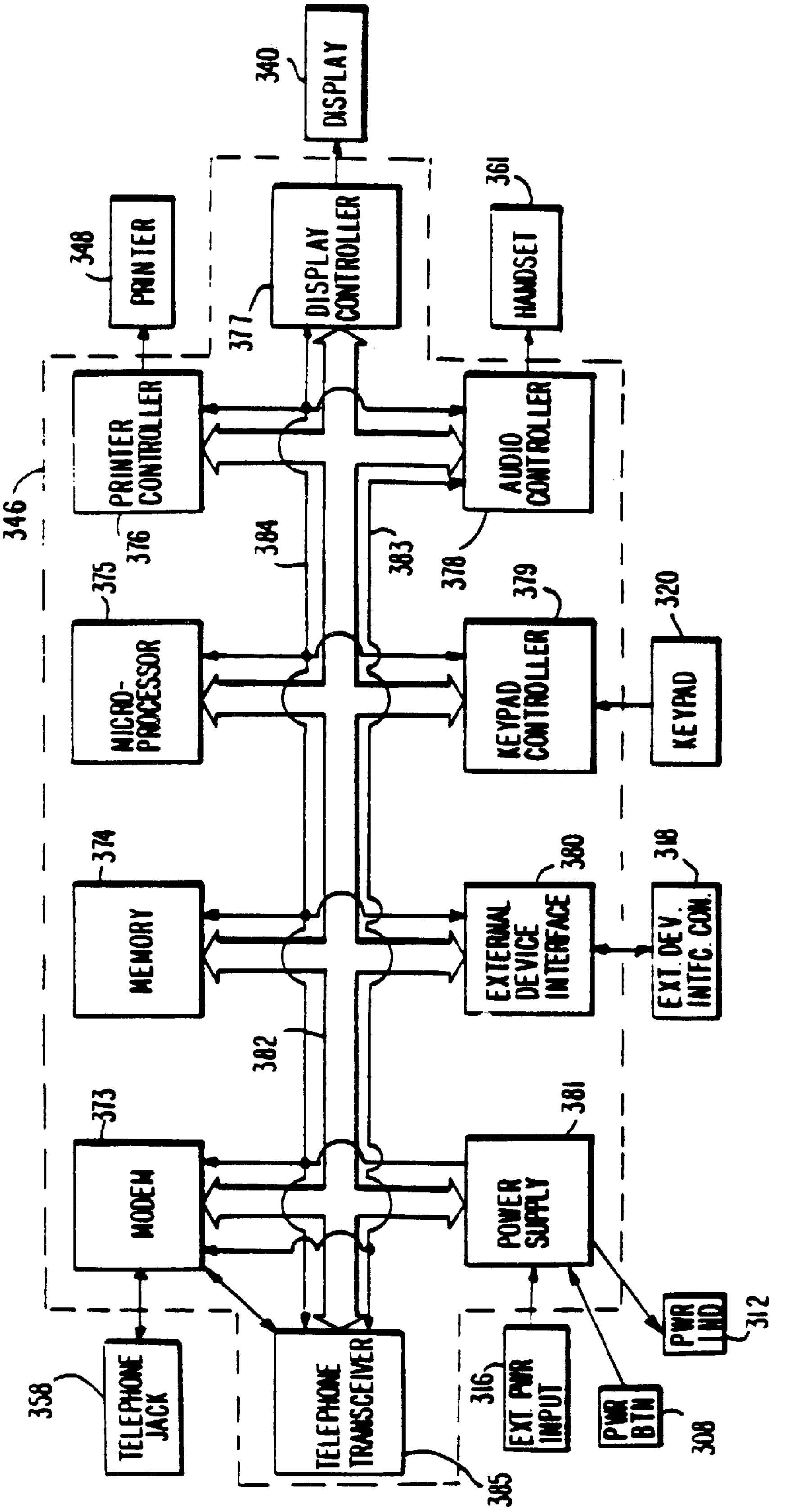
FIG. 11 is a block diagram of an illustrative fixed-location dispenser in accordance with the present invention.

A block diagram of fixed-location dispenser 300 is illustrated in FIG. 11. As shown, fixed location dispenser 300 (FIG. 10) comprises electronics 346, a telephone jack 358, a printer 348, a display 340, a handset 361, a keypad 320, an external device interface connector 318, a power indicator 312, a power button 308, and an external power input 316. Telephone jack 358, display 340, handset 361, keypad 320, external device interface connector 318, power indicator 312, power button 308, and external power input 316 are described above in connection with FIG. 10. Printer 348 is substantially the same as printer 148 described above in connection with FIGS. 3 and 9. Electronics 346 comprises a telephone transceiver 385, a modem 373, memory 374, a microprocessor 375, a printer controller 376, a display controller 377, an audio controller 378, a keypad controller 379, an external device interface 380, and a power supply 381. Modem 373, memory 374, microprocessor 375, printer controller 376, display controller 377, keypad controller 379, and external device interface 380 are substantially the same as modem 173, memory 174, microprocessor 175, printer controller 176, display controller 177, keypad controller 179, and external device interface 180, respectively, that are described above in connection with FIG. 9. Telephone transceiver 385 enables fixed-location dispenser 300 (FIG. 10) to operate as a telephone by converting audio signals sent to and received from audio controller 378 over audio bus 383 to signals that are compatible with a telephone system. Telephone transceiver 385 connects to a telephone system through modem 373 and telephone jack 358. Audio controller 378 in fixed-location dispenser 300 (FIG. 10) is substantially the same as audio controller 178 that is described above in connection with FIG. 9 for portable, hand-held dispenser 100 (FIGS. 2–4) except that in fixed-location dispenser 300 (FIG. 10) audio controller 378 is connected to a handset 361 (which incorporates a speaker and microphone) rather than a separate speaker 110 and a microphone 114, as shown in FIG. 9. Power supply 381 is also substantially the same as power supply 181 that is described above in connection with FIG. 9 for portable, hand-held dispenser 100 (FIGS. 2–4) except that in fixed-location dispenser 300 (FIG. 10) power supply 381 receives power from only external power input 316 and not from a battery 144 as shown in FIG. 9.

Figure 12:
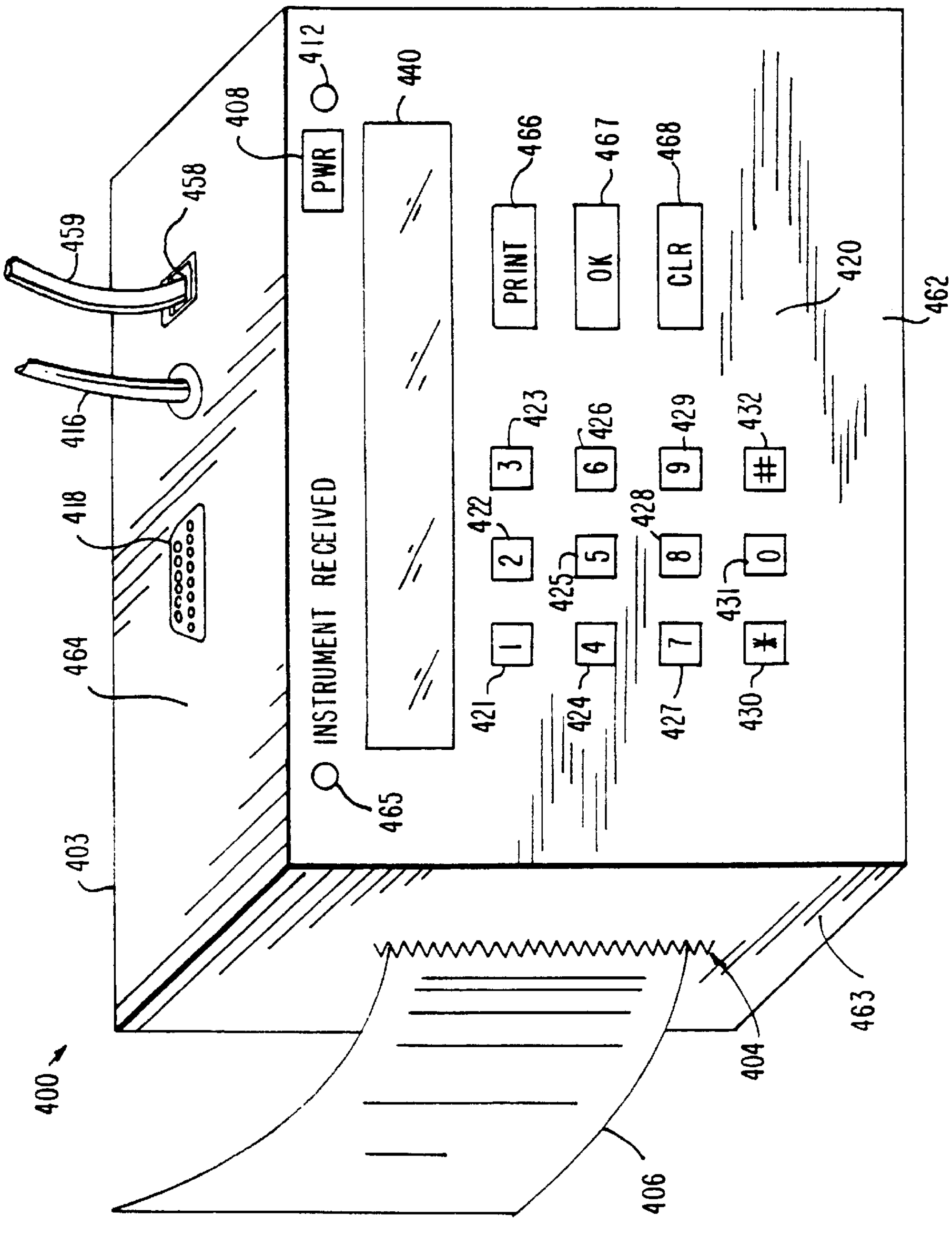
FIG. 12 is a perspective view of a receive-only dispenser in accordance with the present invention.

FIG. 12 illustrates one embodiment 400 of receive-only dispenser 46 (FIG. 1). As shown, receive-only dispenser 400 comprises a body 403 that houses all of the components of receive-only dispenser 400. Body 403 is preferably formed from plastic, although aluminum or any other suitable material may also be used. On a top face 462 of body 403 are a power button 408, a power indicator 412, an instrument received indicator 465, a display 440, and a keypad 420. Power button 408 and power indicator 412 are substantially the same as power button 108 and power indicator 112, respectively, that are described above in connection with FIG. 2. Instrument received indicator 465 is used to indicate to a recipient of an instrument that there are one or more instruments ready to be dispensed by receive-only dispenser 400. Display 440 is used to display menu options, prompts, and information to a user of receive-only dispenser 400. Display 440 is preferably a back-lit liquid crystal display, although any other suitable display may also be used. Keypad 420 is used to control the operation of receive-only dispenser 400, and comprises number keys 421–429 and 431, star key 430, pound key 432, print key 466, OK key 467, and clear key 468. Number keys 421–429 and 431, star key 430, and pound key 432 are substantially the same as number keys 121–129 and 131, star key 130, and pound key 132, respectively, that are described above in connection with FIG. 2. Print key 466 is used to instruct dispenser 400 that a user would like to print a received instrument. Usually the user will press this button in response to the instrument received indicator 465 being illuminated. OK button 467 is used to indicate that a user wishes to accept a current entry, a menu option, or prompt response displayed on display 440. Clear button 468 is used to erase all or part of an entry displayed on display 440.

On a left side 463 of body 403 of receive-only dispenser 400 is a dispensing slot 404 and instruments 406. Dispensing slot 404 and instruments 406 are substantially the same as dispensing slot 104 and instruments 106, respectively, that are described above in connection with FIG. 2. On a back face 464 of body 403 of receive-only dispenser 400 are a telephone jack 458, a telephone line cord 459, an external power input 416, and an external device interface connector 418. Telephone jack 458 and telephone line cord 459 are used to connect receive-only dispenser 400 to a standard telephone wall outlet, and may be any suitable telephone jack and line cord. External power input 416 connects receive-only dispenser 400 to an external source of power such as 110 VAC wall outlet, a DC transformer, or any other suitable source of power. External device interface connector 418, like connector 118 that is described above in connection with FIG. 2, is used to connect receive-only dispenser 400 to external devices such as printers, computers, or any other suitable external devices.

Figure 13:
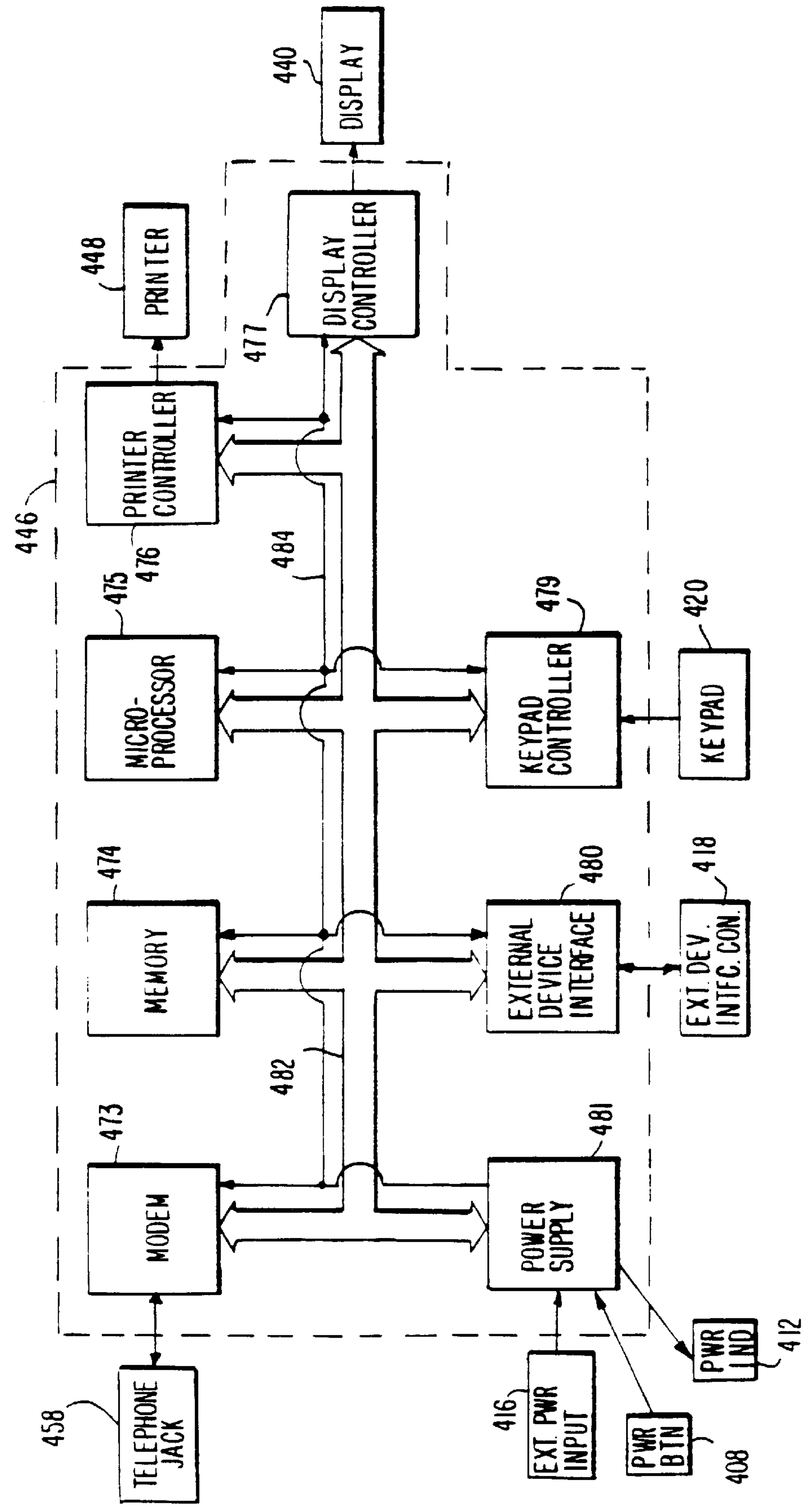
FIG. 13 is a block diagram of an illustrative receive-only dispenser in accordance with the present invention.

A block diagram of receive-only dispenser 400 is illustrated in FIG. 13. As shown, receive only dispenser comprises electronics 446, telephone jack 458, external power input 416, power button 408, power indicator 412, external device interface connector 418, keypad 420, display 440, and printer 448. Telephone jack 458, external power input 416, power button 408, power indicator 412, external device interface connector 418, keypad 420, and display 440, are described above in connection with FIG. 12. Printer 448 is substantially the same as printer 148 that is described above in connection with FIGS. 3 and 9. Electronics 446 comprises a modem 473, memory 474, a microprocessor 475, a printer controller 476, a display controller 477, a keypad controller 479, an external device interface 480, and a power supply 481. Modem 473 is used to allow electronics 446 to communicate with computers, network access servers, and any other suitable equipment, through telephone jack 458. Memory 474, microprocessor 475, printer controller 476, display controller 477, keypad controller 479, and external device interface 480 are substantially the same as memory 174, microprocessor 175, printer controller 176, display controller 177, keypad controller 479, and external device interface 180, respectively, that are described above in connection with FIG. 9. Power supply 481 provides power rectification and regulation, power monitoring, microprocessor 175 watchdog, power button 408 monitoring, and power indicator 412 drive functions. Power supply 481 provides power to each of the electronic circuits of receive-only dispenser 400 (FIG. 12) through power bus 484. Power supply 481 receives power from external power input 416. Whenever power button 408 is depressed, power supply 481 buffers the input depression and sets the power state of receive-only dispenser 400 (FIG. 12) to the appropriate state, and illuminates or extinguishes power indicator 412 accordingly. When turning power off, power supply 481 may request that a power down sequence be executed by microprocessor 475.

Figure 14:
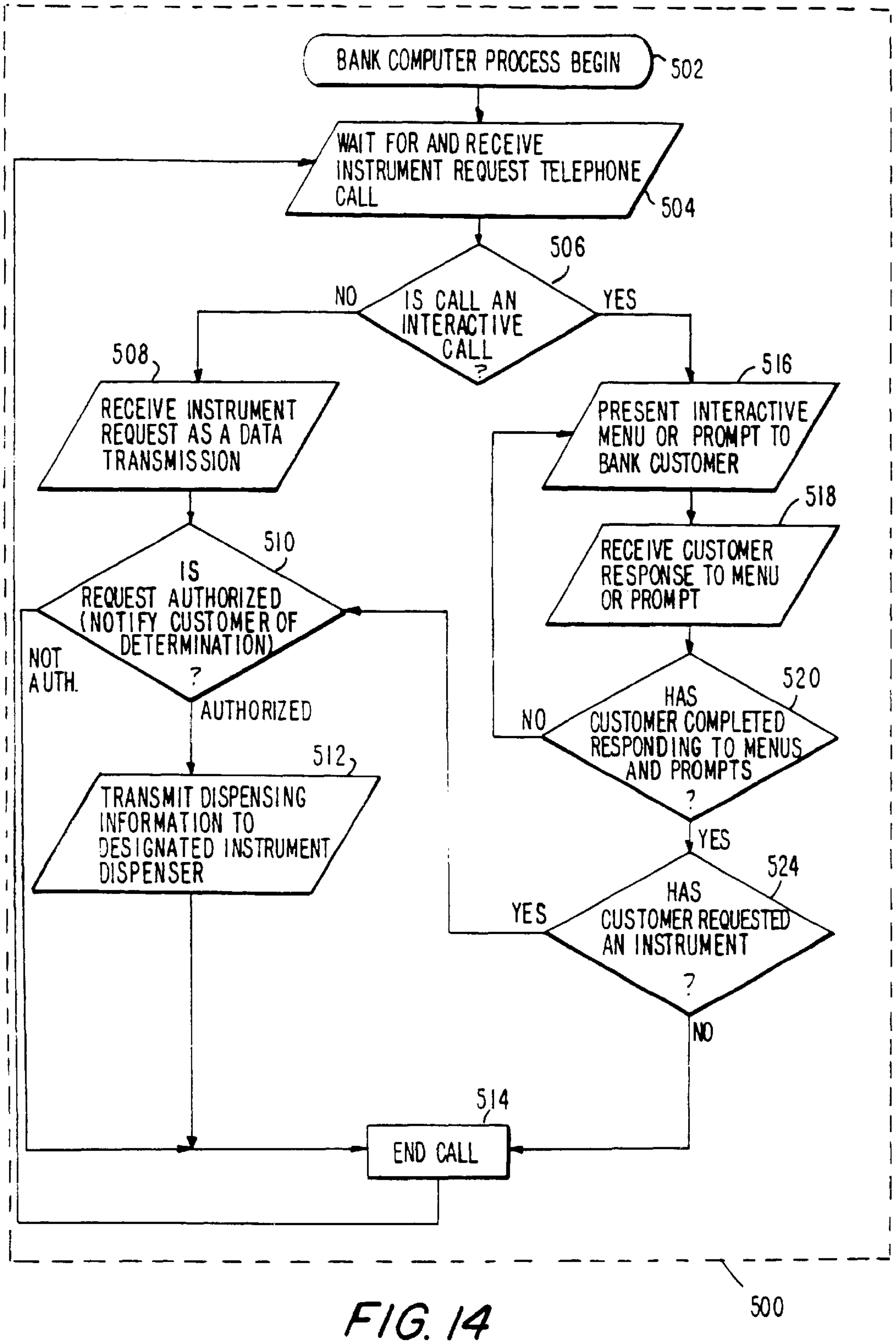
FIG. 14 is a flow diagram showing the processing of instrument requests at a bank computer in accordance with the present invention.

A bank computer process 500 which operates in bank computer 32 (FIG. 1) is illustrated in FIG. 14. As shown, once bank computer process 500 has begun at step 502, process 500 waits for and receives an instrument request telephone call from a customer telephone 44, a customer computer 45, a fixed-location dispenser 48, or a portable, hand-held dispenser 50 (FIG. 1) at step 504. After a call has been received, process 500 determines whether the call is an interactive call at test 506. In an interactive call, a bank customer generates an instrument request by responding to menu options and prompts generated by bank computer 32 (FIG. 1). In a non-interactive call, a bank customer generates an instrument request prior to connecting to bank computer 32 (FIG. 1) and then connects to bank computer 32 (FIG. 1) to transmit the generated request. The determination of whether or not a call is an interactive call may be based in part on the type of call received. Voice response calls and DTMF tone response calls initiated from a customer telephone 44 (FIG. 1), or a fixed-location dispenser 48 or portable, hand-held dispenser 50 (FIG. 1) while operating as a telephone, are interactive calls.

Process 500 may determine that a call is a voice response call or a DTMF tone response call by detecting that no modem signals are present on the telephone line during the first few seconds after the call is received. Calls from a customer computer 45 (FIG. 1) using a dumb terminal or an Internet browser, for example, are also interactive calls. In these cases, although modem signals may be present on the telephone line during the first few seconds after each call is received, process 500 may determine that these calls are interactive calls by not receiving an additional signal, such as a special non-interactive mode indicator data packet, during the first few seconds of each telephone call. Other calls from a customer computer 45, a fixed-location dispenser 48, or a portable, hand-held dispenser 50 (FIG. 1) may be either interactive or non-interactive calls depending upon the particular software (or hardware) implemented in the calling device. In these instances, process 500 may also determine that these calls are interactive or non-interactive based upon whether an additional signal, such as a special non-interactive mode indicator data packet, is received during the first few seconds of each telephone call.

If the call is determined not to be an interactive call at test 506, process 500 then receives an instrument request digitally at step 508. Once this request has been received, process 500 determines whether the requested instrument is authorized and notifies the customer of this determination at test 510. Whether authorization is granted may be based upon factors such as the value of the instrument requested, the available balance or credit in the customer's account, whether a personal identification number (PIN) entered by the bank customer is authentic, and the number or value of previously made requests. If the request is determined not to be authorized at test 510, process 500 then ends the call at step 514 and loops back to step 504 to wait for more telephone calls. If, however, the request is determined to be authorized at test 510, then process 500 transmits dispensing information to the designated instrument dispenser at step 512. This instrument dispenser may be any receive-only dispenser 46, fixed-location dispenser 48, or portable, hand-held dispenser 50 (FIG. 1) which can communicate with bank computer 32 (FIG. 1).

If the call is determined to be an interactive call at test 506, process 500 then presents an interactive menu or prompt to the bank customer at step 516. In response to this menu or prompt, the customer enters, and the bank computer 32 (FIG. 1) receives, a response at step 518. After each response is received at step 518, process 500 then determines whether the customer has completed responding to menus and prompts at test 520. If the customer has not completed responding to menus or prompts, then process 500 loops back to step 516 to present more menus or prompts to the customer. Otherwise, process 500 proceeds to test 524 to determine if the customer has requested an instrument. If process 500 determines that an instrument has not been requested at test 524, process 500 ends the telephone call at step 514 and loops back to step 504 to wait for and receive other telephone calls.

If, however, process 500 determines that an instrument has been requested at test 524, then process 500 branches to test 510 to determine whether the requested instrument is authorized and to notify the customer of this determination. If the requested instrument is authorized, process 500 then transmits dispensing information to the designated instrument dispenser at step 512. The designated instrument dispenser is preferably indicated in the instrument request submitted by the bank customer, however a default instrument dispenser designation may also be used. Once the dispensing information has been transmitted at step 512 or if test 510 determines that the requested instrument is not authorized, then process 500 ends the telephone call at step 514 and loops back to step 504 to wait for another call.

Prior to transmitting dispensing information to a fixed-location dispenser 48 or portable, hand-held dispenser 50 (FIG. 1) that is being used as a telephone or in an interactive-voice mode, step 512 may have to prompt the bank customer to activate a modem in dispenser 48 or 50 (FIG. 1) by pressing a "receive" key 138 (FIG. 2) or 338 (FIG. 10). Also, when transmitting dispensing information to a designated instrument dispenser, a bank computer may have to first establish communications with the designated instrument dispenser before the information can be transmitted. For example, in those cases in which a customer requests that an instrument be dispensed from an instrument dispenser that is not the same as an instrument dispenser that is being used to submit the instrument request, or in instances where a customer submits an instrument request from a customer telephone or customer computer, the bank computer will have to establish communications with the designated instrument dispenser prior to transmitting the dispensing information.

Figure 15:
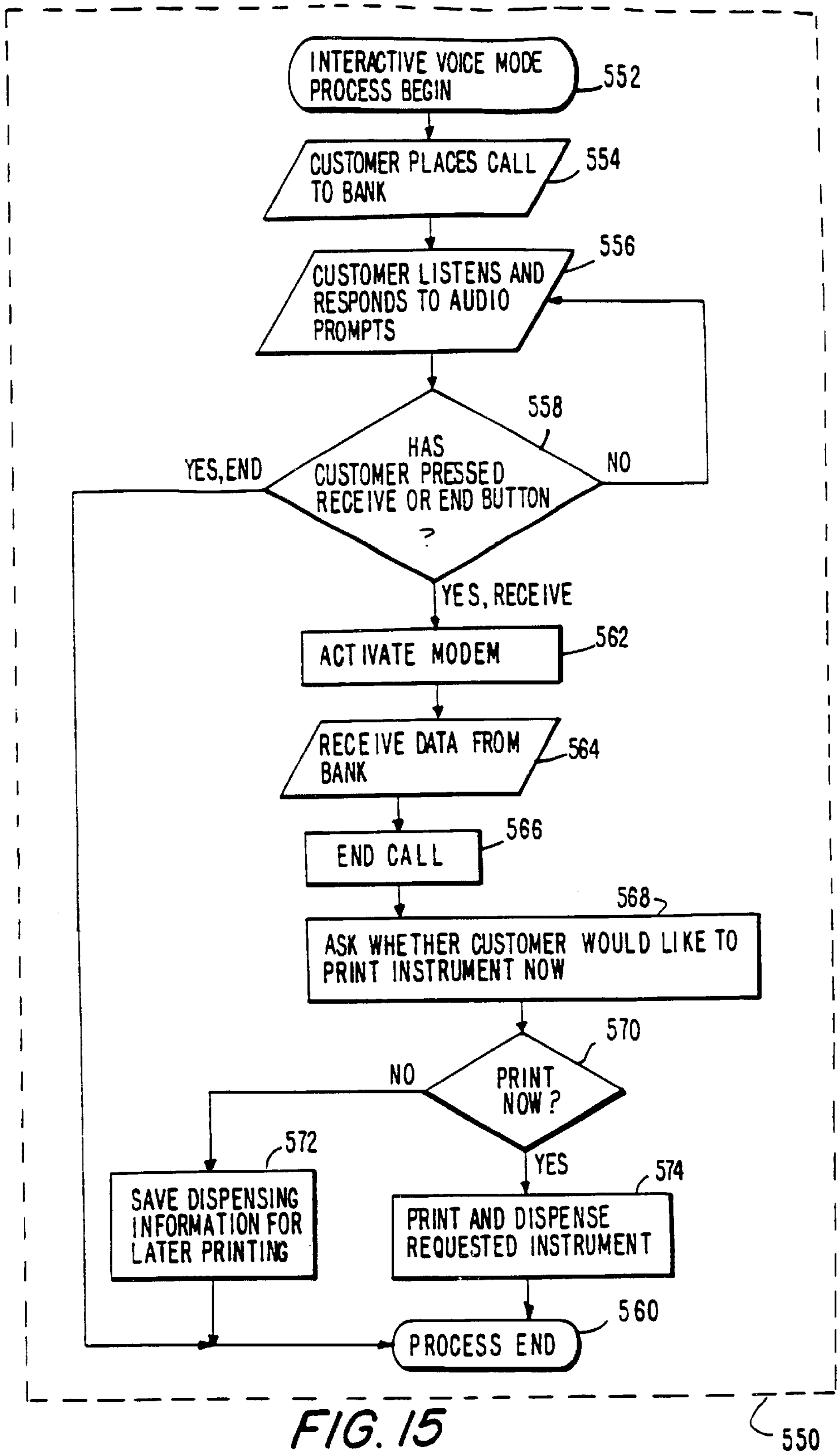
FIG. 15 is a flow diagram showing the requesting and dispensing of instruments using an interactive voice mode in accordance with the present invention.

A process for an interactive voice mode 550 in a fixed-location dispenser 48 or portable, hand-held dispenser 50 (FIG. 1) is illustrated in FIG. 15. Interactive voice mode process 550 may be initiated by a bank customer selecting an interactive voice mode menu option from a main menu of options on the dispenser 48 or 50. As shown, once the interactive voice mode process has begun at step 552, the bank customer places a telephone call to a bank computer 32 (FIG. 1) at step 554. This call may be placed automatically upon selecting to initiate an interactive-voice-mode instrument request option from a main menu on dispenser 48 or 50 (FIG. 1) or may be manually placed when using dispenser 48 or 50 (FIG. 1) as a telephone. Once the call is received by bank computer 32 (FIG. 1), the computer will generate a series of menu options and prompts to which the customer will listen and respond at step 556. These options and prompts may be presented using a recorded voice, a synthesized voice, or the voice of a live bank employee. For example, one menu may give the customer the option of hearing his or her account balance or requesting a money order. As another example, prompts may ask a customer to enter his or her account number, his or her PIN, a number for a selected payee from a menu of payees, an amount to be indicated on the instrument, a selected currency type from a menu of currency types, a payment date, etc.

In order to respond to these options and prompts, for example, the bank customer may press any of the number keys 121–129 and 131, the star key 130, or the pound key 132 (FIG. 2) on portable, hand-held dispenser 100 (FIG. 2) to generate the corresponding DTMF tone. Each response may be completed by entering an indicated number of digits or only the necessary digits (omitting leading zeros) followed by pound key 132 (FIG. 2). When entering a letter, the customer may enter the number that corresponds to that letter on number keys 121–129 (FIG. 2) a predetermined number of times in rapid succession. For example, to enter a "c," the customer may press two key 122 four times, to enter a "b," the customer may press two key 122 three times, to enter an "a," the customer may press two key 122 two times, and to enter a "2," the customer may press two key 122 one time. Alternatively to responding using DTMF tones, the customer may submit voice responses to a bank employee or a suitable voice recognition system incorporated into bank computer 32 (FIG. 1).

While the bank customer is interacting with the bank computer 32 (FIG. 1), process 550 monitors a receive key and an end key on dispenser 48 or 50 (FIG. 1) at test 558. If neither a receive key or an end key has been pressed, process 550 loops back to step 556 to allow the bank customer to listen and respond to more menu options and prompts. If an end key is pressed, process 550 terminates at step 560. If the customer has pressed a receive key, possibly in response to direction from a bank computer 32 (FIG. 1), dispenser 48 or 50 (FIG. 1) activates its modem at step 562, receives dispensing information from bank computer 32 (FIG. 1) at step 564, and ends the call at step 566. After dispensing information has been received and the call has been completed, dispenser 48 or 50 (FIG. 1) prompts and determines whether the customer would like to print the requested instrument now or later at step 568 and test 570. If it is determined that the customer would like to print now, then the requested instrument is printed and dispensed at step 574. Otherwise, the dispensing information for the requested instrument is stored for later printing at step 572. After the requested instrument has been dispensed at step 574 or the dispensing information has been saved for later printing at step 572, process 550 is terminated at step 560.

Figure 16:
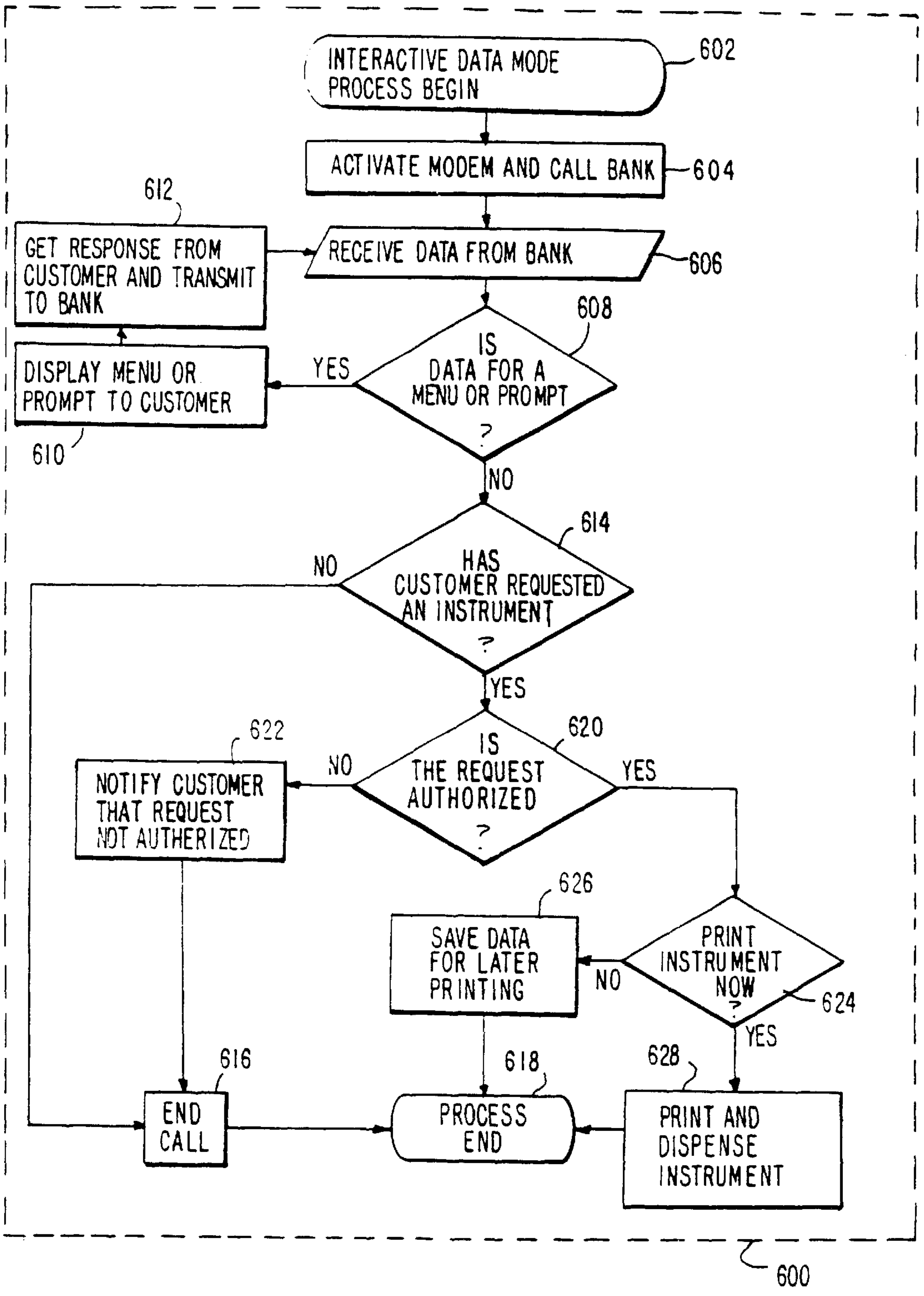
FIG. 16 is a flow diagram showing the requesting and dispensing of instruments using an interactive data mode in accordance with the present invention.

FIG. 16 illustrates an interactive data mode process 600 for a fixed-location dispenser 48 or portable, hand-held dispenser 50 (FIG. 1). Interactive data mode process 600 may be initiated by a bank customer selecting an interactive data mode menu option from a main menu of options on dispenser 48 or 50 (FIG. 1). Once process 600 has begun at step 602, process 600 activates a modem in dispenser 48 or 50 (FIG. 1) and calls a bank computer 32 (FIG. 1) at step 604. After the call to the bank computer 32 (FIG. 1) has been established, data is received from the bank computer 32 (FIG. 1) at step 606. This data may be menu information, prompt information, request notification information, dispensing information, and/or any other suitable information. Process 600 then determines whether this information is for a menu or prompt at test 608. If the data is determined to be for a menu or prompt, then the menu or prompt is displayed at step 610 and a response is received from the customer and transmitted to the bank computer 32 (FIG. 1) at step 612. Once this response is transmitted to bank computer 32 (FIG. 1), process 600 returns to step 606 to receive more data from bank computer 32 (FIG. 1).

If the data is determined not to be for a menu or prompt at test 608, then process 600 determines whether the bank customer has requested an instrument at test 614. If the customer has not requested an instrument at test 614, the call is ended at step 616 and process 600 terminated at step 618. If the customer has requested an instrument, then process 600 determines whether the request has been authorized at test 620. If the request is not authorized, the customer is notified at step 622, the call is ended at step 616, and process 600 is terminated at step 618. Otherwise, if the request is determined to be authorized at test 620, then process 600 asks whether the customer would like to print the requested instrument now or later at step 624. If the customer elects to print the instrument now, the instrument is printed and dispensed at step 628. Otherwise, if the customer elects to print the instrument later, the dispensing information for the instrument is saved at step 626. Once the instrument has been printed at step 628 or the dispensing information saved at step 626, process 600 is terminated at step 618.

Figure 17:
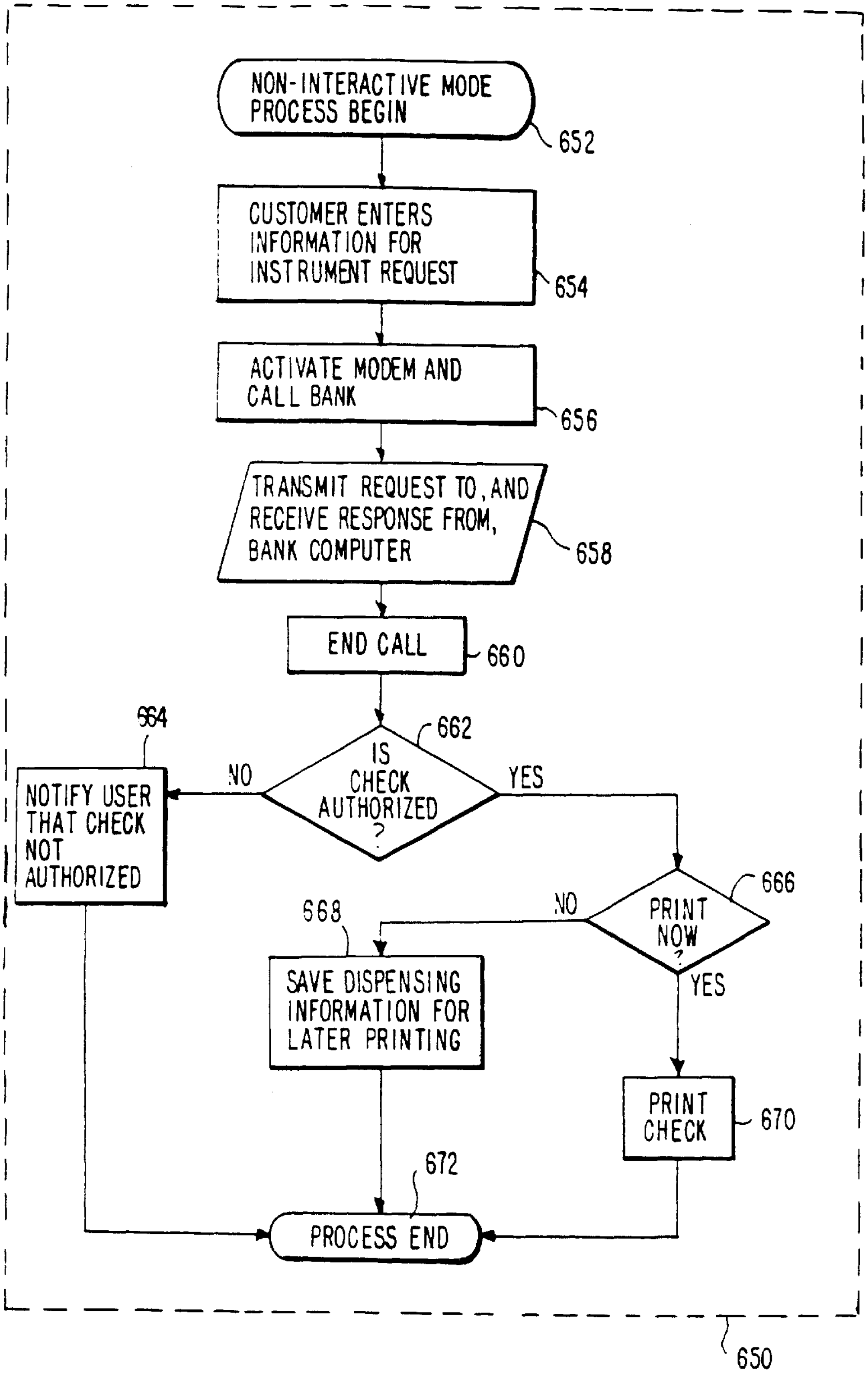
FIG. 17 is a flow diagram showing the requesting and dispensing of instruments using a non-interactive mode in accordance with the present invention.

A non-interactive mode process 650 for a fixed-location dispenser 48 or portable, hand-held dispenser 50 (FIG. 1) is illustrated in FIG. 17. Non-interactive mode process 650 may be activated by selecting a non-interactive mode process menu option or a fast cash menu option from a main menu on a dispenser 48 or 50 (FIG. 1). Once process 650 has begun at step 652, menus and prompts are presented to a bank customer and the customer enters the required information to generate an instrument request at step 654. Once the instrument request has been generated, process 650 activates a modem in dispenser 48 or 50 (FIG. 1) and calls bank computer 32 (FIG. 1) at step 656. After communications have been established between bank computer 32 and dispenser 48 or 50 (FIG. 1), the instrument request is transmitted to the bank computer 32 (FIG. 1) and a response to the instrument request is received at dispenser 48 or 50 (FIG. 1) at step 658. This response may include a denial notification, or an authorization notification and/or dispensing information. Upon the response being received, the call is terminated at step 660.

Once the call has been terminated, process 650 determines from the response whether the instrument request has been authorized at test 662. If the request is determined not to be authorized at test 662, then process 650 notifies the bank customer of the denial at step 664 and process 650 is terminated at step 672. Otherwise, if the request is determined to be authorized at test 662, then process 650 determines whether the customer would like to print the requested instrument now or later at test 666. If it is determined that the bank customer would like to print the requested instrument later, the dispensing information for that instrument is saved for later printing at step 668. Otherwise, if it is determined that the bank customer would like to print the requested instrument now, the requested instrument is printed and dispensed at step 670. Once the dispensing information has been saved at step 668 or the instrument is printed at step 670, process 650 is terminated at step 672.

Figure 18:
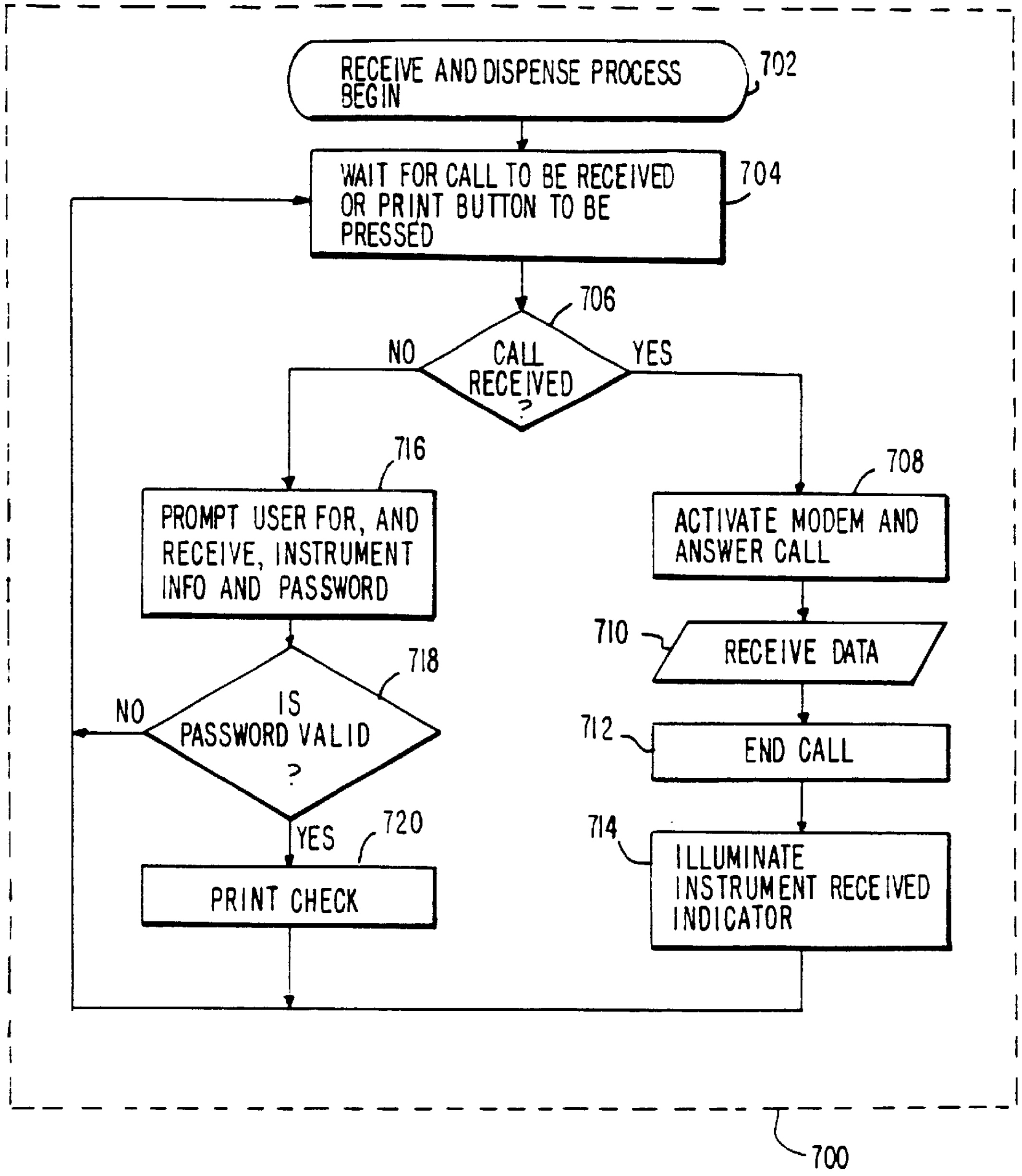
FIG. 18 is a flow diagram showing the receipt of authorization for, and printing and dispensing of, instruments using a receive-only dispenser in accordance with the present invention.

A receive and dispense process 700 for execution in a receive-only dispenser 46, fixed-location dispenser 48, or portable, hand-held dispenser 50 (FIG. 1) is illustrated in FIG. 18. As shown, once process 700 has begun at step 702, process 700 waits for a call to be received at dispenser 46, 48, or 50 (FIG. 1), or for a print button to be depressed or menu option selected on dispenser 46, 48, or 50 (FIG. 1), at step 704. Once a call has been received or a print button or menu option has been selected, process 700 determines whether a call or print request was received at test 706. If a call is determined to have been received, then process 700 activates a modem in dispenser 46, 48, or 50 (FIG. 1) and answers the call at step 708. Once the call has been answered, process 700 receives data from the bank computer 32 (FIG. 1) at step 710 and ends the call at step 712. After the call has been terminated, process 700 illuminates an instrument received indicator or displays an instrument received message on dispenser 46, 48, or 50 (FIG. 1) at step 714 and loops back to step 704 to wait for another call to be received or for a print request.

If, however, a call is determined not to have been received at test 706, then process 700 prompts a user of dispenser 46, 48, or 50 (FIG. 1), who may be a bank customer or instrument recipient, for and receives instrument identification information and a password at step 716. The instrument identification information is used to identify the desired one of multiple instruments for which dispensing information may be stored in a particular dispenser 46, 48, or 50 (FIG. 1). This instrument identification information may include any of the dispensing information transmitted to dispenser 46, 48, or 50 (FIG. 1) from bank computer 32 (FIG. 1), and preferably includes an account number and an instrument number. After the instrument identification information and password have been entered, process 700 determines if the password is valid at test 718. This may be accomplished by comparing the password entered with a password or PIN included in the corresponding dispensing information stored in dispenser 46, 48, or 50 (FIG. 1). If the password is determined to be valid, the requested instrument is printed and dispensed to the user at step 720. Once the requested instrument has been dispensed at step 720 or if it is determined that the entered password is invalid at test 718, then process 700 loops back to step 704 to wait for another call or print request.

Thus, a system and method for requesting and dispensing negotiable instruments through which a bank customer can request and receive a negotiable instrument using a portable, hand-held dispenser, and through which a bank customer can request from one device that a negotiable instrument be printed and dispensed from another device, is provided. It will be understood that the foregoing is only illustrative of the principles of the invention and that various modifications can be made by those skilled in the art without departing from the scope and spirit of the invention, which is limited only by the claims that follow.

What is claimed is:

1. A system that may be used by a bank customer to request and dispense a negotiable instrument, said system comprising:

a bank computer;

a communication network connected to said bank computer;

a device that is in communication with said bank computer through said communication network and that is used by the bank customer to submit a request for the negotiable instrument to said bank computer, said request including a dispenser designation that does not designate said device; and an instrument dispenser that is in communication with said bank computer through said communication network, that is designated by said dispenser designation, and that receives information from said bank computer that enables said instrument dispenser to dispense the negotiable instrument.

2. The system of claim 1, wherein said device is a customer telephone.

3. The system of claim 1, wherein said device is a customer computer.

4. The system of claim 1, wherein said device is a fixed-location dispenser.

5. The system of claim 1, wherein said device is a portable, hand-held dispenser.

6. The system of claim 1, wherein said instrument dispenser is a receive-only dispenser.

7. The system of claim 1, wherein said instrument dispenser is a fixed-location dispenser.

8. The system of claim 1, wherein said instrument dispenser is a portable, hand-held dispenser.

9. A method for requesting and dispensing a negotiable instrument, said method comprising:

generating at least part of a request for a negotiable instrument using a device, wherein said at least a part of a request includes a designation of a designated instrument dispenser that is not said device;

submitting said at least a part of a request to a bank computer through a communication network from said device; and receiving information from said bank computer through said communication network at said designated instrument dispenser that enables said designated instrument dispenser to dispense the negotiable instrument.

10. The method of claim 9, wherein said device is a customer telephone.

11. The method of claim 9, wherein said device is a customer computer.

12. The method of claim 9, wherein said device is a fixed-location dispenser.

13. The method of claim 9, wherein said device is a portable, hand-held dispenser.

14. The method of claim 9, wherein said instrument dispenser is a receive-only dispenser.

15. The method of claim 9, wherein said instrument dispenser is a fixed-location dispenser.

16. The method of claim 9, wherein said instrument dispenser is a portable, hand-held dispenser.

* * * * *